United States Patent
Jung et al.

(10) Patent No.: US 10,199,837 B2
(45) Date of Patent: Feb. 5, 2019

(54) METHOD FOR CHARGING BATTERY AND ELECTRONIC DEVICE

(71) Applicant: Samsung Electronics Co., Ltd., Suwon-si, Gyeonggi-do (KR)

(72) Inventors: Ku Chul Jung, Seoul (KR); Sung Geun Yoon, Hwaseong-si (KR); Chul Eun Yun, Hwaseong-si (KR); Kisun Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 117 days.

(21) Appl. No.: 14/673,028

(22) Filed: Mar. 30, 2015

(65) Prior Publication Data

US 2015/0280457 A1    Oct. 1, 2015

(30) Foreign Application Priority Data

Mar. 28, 2014 (KR) .................. 10-2014-0037024
Jun. 11, 2014 (KR) .................. 10-2014-0070936

(51) Int. Cl.
*H02J 7/00* (2006.01)
*H02M 3/155* (2006.01)

(52) U.S. Cl.
CPC .......... *H02J 7/0004* (2013.01); *H02J 7/0036* (2013.01); *H02J 2007/0059* (2013.01); *H02M 3/155* (2013.01)

(58) Field of Classification Search
CPC .......... H02J 7/00; H02J 7/0004; H02J 7/0036; G05F 1/40; H01M 10/44

(Continued)

(56) References Cited

U.S. PATENT DOCUMENTS 6,025,695 A * 2/2000 Friel ................ H01M 10/4257
                                                    112/130
6,667,599 B2   12/2003 Stone et al.
(Continued)

FOREIGN PATENT DOCUMENTS

CN    101449447 A    6/2009
CN    101467327 A    6/2009
(Continued)

OTHER PUBLICATIONS

European Search Report dated Nov. 16, 2017, issued in the European Application No. 15768184.2.

*Primary Examiner* — Richard Isla
*Assistant Examiner* — Dung V Bui
(74) *Attorney, Agent, or Firm* — Jefferson IP Law, LLP

(57) ABSTRACT

An electronic device is provided. The electronic device includes a connector to which an external device is connected, a control unit identifying a connected external device and controlling operations of a voltage conversion unit and a charging and discharging unit according to a result of an identification, the voltage conversion unit bypassing a supply voltage supplied from the external device, boosting the supply voltage, or converting a battery voltage of a battery connected to an electronic device to supply a converted voltage to the external device, according to the result of the identification, and the charging and discharging unit lowering a voltage supplied from the voltage conversion unit or bypassing the battery voltage of the battery to the voltage conversion unit, according to the result of the identification.

24 Claims, 11 Drawing Sheets

(58) Field of Classification Search
USPC .................. 320/106, 134, 137; 323/265
See application file for complete search history.

(56) References Cited

U.S. PATENT DOCUMENTS

| | | | |
|---|---|---|---|
| 6,765,368 | B2 | 7/2004 | Stone et al. |
| 7,002,265 | B2 * | 2/2006 | Potega ................ B60L 11/185 307/149 |
| 7,508,162 | B2 | 3/2009 | Lippojoki et al. |
| 7,550,951 | B2 | 6/2009 | Lai et al. |
| 7,573,238 | B2 | 8/2009 | Kawai |
| 8,030,900 | B2 | 10/2011 | Hussain et al. |
| 8,089,253 | B2 | 1/2012 | Murtojarvi |
| 8,538,494 | B2 | 9/2013 | Hsu |
| 8,610,405 | B2 | 12/2013 | Yamazaki et al. |
| 8,766,600 | B2 | 7/2014 | Hussain et al. |
| 8,810,208 | B2 | 8/2014 | Krauer et al. |
| 2003/0151392 | A1 * | 8/2003 | Stone .................. H02J 1/08 320/137 |
| 2004/0108839 | A1 | 6/2004 | Stone et al. |
| 2006/0006850 | A1 * | 1/2006 | Inoue .................. H02J 7/0065 323/265 |
| 2006/0249587 | A1 | 11/2006 | Choi et al. |
| 2007/0008745 | A1 * | 1/2007 | Joshi .................. H02M 3/1588 363/21.01 |
| 2007/0236975 | A1 | 10/2007 | Lippojoki et al. |
| 2008/0054855 | A1 | 3/2008 | Hussain et al. |
| 2008/0136373 | A1 | 6/2008 | Lai et al. |
| 2008/0238372 | A1 * | 10/2008 | Cintra ................ H01M 10/052 320/137 |
| 2008/0278136 | A1 | 11/2008 | Murtojarvi |
| 2009/0128158 | A1 | 5/2009 | Kawai |
| 2009/0174366 | A1 | 7/2009 | Ahmad et al. |
| 2011/0006603 | A1 * | 1/2011 | Robinson ............... G06F 1/263 307/31 |
| 2011/0074356 | A1 * | 3/2011 | Yamazaki ............ H02J 7/0052 320/134 |
| 2011/0298426 | A1 | 12/2011 | Hussain et al. |
| 2012/0229098 | A1 | 9/2012 | Krauer et al. |
| 2012/0231857 | A1 | 9/2012 | Hsu |
| 2013/0049673 | A1 * | 2/2013 | Agarwal ............... H02J 7/0016 320/101 |
| 2013/0154550 | A1 | 6/2013 | Balmefrezol et al. |
| 2013/0234686 | A1 | 9/2013 | Grant et al. |
| 2014/0003108 | A1 | 1/2014 | Song et al. |
| 2014/0028242 | A1 * | 1/2014 | Akin ..................... H02J 7/35 320/101 |
| 2014/0118877 | A1 * | 5/2014 | Viele .................... H02H 9/005 361/111 |

FOREIGN PATENT DOCUMENTS

| | | | |
|---|---|---|---|
| CN | 101689806 A | 3/2010 | |
| CN | 203014464 U | 6/2013 | |
| CN | 103607006 A | 2/2014 | |
| JP | 2012-191841 A | 10/2012 | |
| WO | 2008/135637 A1 | 11/2008 | |
| WO | WO 2008142480 A2 * | 11/2008 | ............. H02J 3/383 |

* cited by examiner

METHOD FOR CHARGING BATTERY AND ELECTRONIC DEVICE

CROSS-REFERENCE TO RELATED APPLICATION(S)

This application claims the benefit under 35 U.S.C. § 119(a) of a Korean patent application filed on Mar. 28, 2014 in the Korean Intellectual Property Office and assigned Serial number 10-2014-0037024, and of a Korean patent application filed on Jun. 11, 2014 in the Korean Intellectual Property Office and assigned Serial number 10-2014-0070936, the entire disclosure of each of which is hereby incorporated by reference.

TECHNICAL FIELD

The present disclosure relates to a method for charging a battery and to an electronic device.

BACKGROUND

Recent mobile electronic devices, such as smart phones, televisions (TVs), and tablet personal computers (PCs), have high hardware specifications and thus support high performance and quick speed. Also, the mobile electronic devices are providing various user interface environments in order to increase user convenience. With the high hardware specification and various functions and user interface environments, the power consumption of the electronic devices increases.

Electronic devices may increase battery capacity by using various methods in order to support increased power consumption. For example, it is possible to connect a plurality of battery cells in series or in parallel. However, the portability and stability of mobile electronic devices and compatibility with typical electronic devices should be considered in increasing the battery capacity of the mobile electronic devices.

When the plurality of battery cells are connected in parallel, an instant battery voltage drop may occur if the current consumption of the mobile electronic devices increases. Thus, a phenomenon that integrated circuits (ICs) using battery voltages in the mobile electronic devices are reset may occur. Thus, there may be a limitation in stability.

When the plurality of battery cells are connected in series, total battery voltages increase and thus a high voltage charger that may charge a high voltage battery, a high power adapter that may supply a high voltage to the high voltage charger, and a high power direct current (DC) jack that may be connected to the high power adapter are needed. Also, it is difficult to use typical power adapters for charging batteries and DC jacks connectable to the power adapter. Thus, costs and sizes may increase.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device that may provide compatibility and minimize the size and manufacturing cost of a mobile electronic device while the electronic device stably uses a large battery.

Another aspect of the present disclosure is to provide a method for charging a battery, and an electronic device.

Another aspect of the present disclosure is to provide a non-transitory computer readable recording medium having a program to execute the method with a computer. Technical issues to be addressed by various embodiments of the present disclosure are not limited to those described above and there may be other technical issues.

In accordance with an aspect of the present disclosure, an electronic device is provided. The electronic device includes a connector to which an external device is connected, a control unit identifying the connected external device and controlling operations of a voltage conversion unit and a charging and discharging unit according to a result of an identification, the voltage conversion unit bypassing a supply voltage supplied from the external device, boosting the supply voltage, or converting a battery voltage of a battery connected to the electronic device to supply the converted voltage to the external device, according to the result of the identification, and the charging and discharging unit lowering a voltage supplied from the voltage conversion unit or bypassing the battery voltage of the battery to the voltage conversion unit, according to the result of the identification.

In accordance with another aspect of the present disclosure, a charging device is provided. The charging device includes a voltage conversion unit configured to bypass or boost a supply voltage of a power supply device when a control signal by a connection of the power supply device is received, and to convert a battery voltage of a battery connected to the charging device when a control signal by a connection of a power consumption device is received, and a charging and discharging unit configured to lower a voltage supplied from the voltage conversion unit or bypassing the battery voltage of the battery to the voltage conversion unit, according to a received control signal.

In accordance with another aspect of the present disclosure, a method of charging a battery is provided. The method includes receiving a control signal, bypassing or boosting a supply voltage of a power supply device and lowering a bypassed voltage or boosted voltage to charge a battery, if a received control signal is a control signal by a connection of the power supply device, and bypassing a battery voltage of the battery in an opposite direction to when charging is performed and converting a bypassed battery voltage to supply a converted voltage to a power consumption device, if the received control signal is a control signal by a connection of the power consumption device.

In accordance with another aspect of the present disclosure, it is possible to provide a non-transitory computer-readable recording medium having thereon a program for executing the method of charging the battery.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
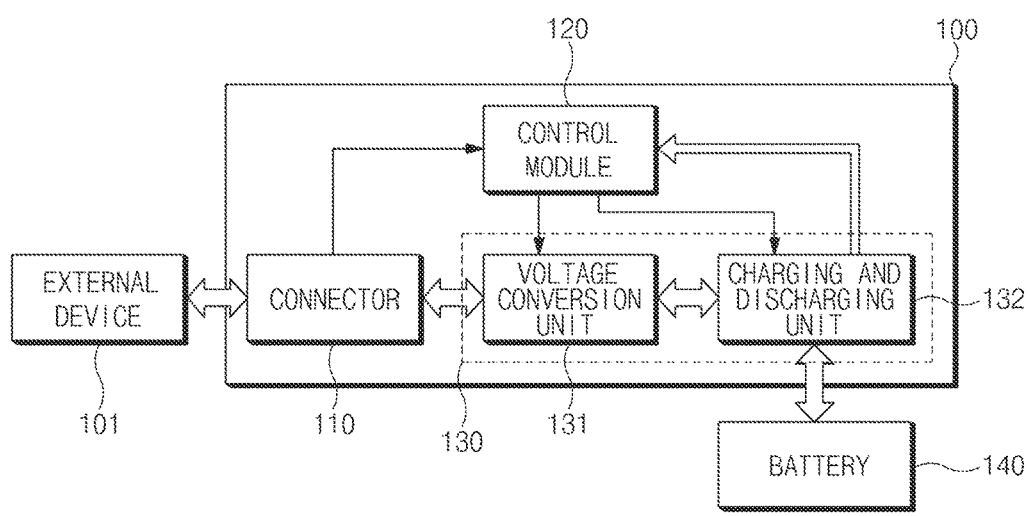
FIG. 1 shows a block diagram of an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expression "include" or "may include" that may be used in describing the embodiments of the present disclosure indicates the presence of a disclosed corresponding function, operation or component but does not exclude one or more functions, operations or components in addition. Furthermore, in describing the embodiments of the present disclosure, it should be understood that the term "includes" or "has" indicates the presence of characteristics, numbers, operations, components, parts or combinations thereof represented in the present disclosure but does not exclude the presence or addition of one or more other characteristics, numbers, operations, components, parts or combinations thereof.

The expression "or" in the various embodiments of the present disclosure includes any and all combinations of enumerated words. For example, the expression "A or B" may include A, B, or both A and B.

The expression "first", "second", "firstly", or "secondly" in the various embodiments of the present disclosure may modify various elements of the various embodiments but does not limit corresponding components. For example, the expressions above do not limit the order and/or importance of corresponding components. The expressions above may be used to distinguish one element from another. For example, both a first user device and a second user device are user devices that are mutually different user devices. For example, the first element may be named as the second element without departing from the scope of a right of various embodiments of the present disclosure, and similarly, the second element may also be named as the first element.

When any element is referred to as being "connected" or "accessed" to another element, it should be understood that the former can be "directly connected" to the latter, or there may be another element in between. On the contrary, when any element is referred to as being "directly connected" or "directly accessed" to another element, it should be understood that there may be no other element in between.

The terms used in describing the various embodiments of the present disclosure are used only to describe specific embodiments and are not intended to limit the various embodiments of the present disclosure.

Unless otherwise defined, all terms used herein including technical or scientific terms have the same meanings as those generally understood by a person skilled in the art. Terms defined in generally used dictionaries should be construed to have meanings matching contextual meanings in the related art and should not be construed as having an ideal or excessively formal meaning unless otherwise defined herein.

An electronic device according to various embodiments of the present disclosure may be a device that includes a communication function. For example, the electronic device may include at least one of a smart phone, a tablet Personal Computer (PC), a mobile phone, a video phone, an e-book reader, a desktop PC, a laptop PC, a net book computer, a Personal Digital Assistant (PDA), a Portable Multimedia Player (PMP), an MP3 player, a mobile medical device, a camera, and a wearable device (e.g., a Head-Mounted-Device (HMD) such as electronic glasses, electronic clothing, an electronic bracelet, an electronic necklace, an electronic appcessory, an electronic tattoo, or a smart watch).

According to various embodiments of the present disclosure, the electronic device may be a smart home appliance having a communication function. The smart home appliance may include, for example, at least one of a television (TV), a Digital Versatile Disk (DVD) player, an audio set, a refrigerator, an air conditioner, a cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic frame.

According to various embodiments of the present disclosure, the electronic device may include at least one of various medical devices (e.g., a Magnetic Resonance Angiography (MRA) device, a Magnetic Resonance Imaging (MRI) device, a Computed Tomography (CT) device, an imaging device, and an ultrasonicator), a navigation device, a Global Positioning System (GPS) receiver, an Event Data Recorder (EDR), a Flight Data Recorder (FDR), a car infotainment device, electronic equipment for a ship (e.g., a navigation device for a ship or a gyro compass), avionics, a security device, a head unit for a vehicle, an industrial or home robot, an Automated Teller Machine (ATM) for financial institution, or a point of sales for a store.

According to various embodiments of the present disclosure, the electronic device may include at least one of a portion of a building/structure or furniture including a communication function, an electronic board, an electronic signature receiving device, a projector, and various measurement devices (e.g., water, electricity, gas and electric wave meters). The electronic device according to various embodiments of the present disclosure may be one or more combinations of the above-described various devices. Moreover, the electronic device according to various embodiments of the present disclosure may be a flexible device. Moreover, it is obvious to a person skilled in the art that the electronic device according to various embodiments of the present disclosure is not limited to the above-described devices.

Electronic devices according to various embodiments of the present disclosure are described below with reference to the accompanying drawings. The term "user" used in various embodiments of the present disclosure may refer to a person who uses an electronic device, or a device (e.g., an electronic device having artificial intelligence) that uses an electronic device.

FIG. 1 shows a block diagram of an electronic device according to various embodiments of the present disclosure.

Referring to FIG. 1, an electronic device 100 may include a connector 110, a control module 120, and a charging and discharging module 130. The charging and discharging module 130 may include a voltage conversion unit 131 and a charging and discharging unit 132.

In order to prevent the characteristic of the present embodiment from becoming obscure, only elements related to the present embodiment are herein described. Thus, a person skilled in the art to which the present embodiment pertains may understand that other general elements in addition to the elements as shown in FIG. 1 may be further included.

The electronic device 100 may identify an external device 101 connected through the connector 110, and change the operation mode of the charging and discharging module 130 according to an identification result to charge a battery 140 or supply a battery voltage to the external device 101.

The connector 110 may connect the external device 101 to the electronic device 100. Various types of external device 101 such as a power adapter or USB device may be connected to the connector 110. For example, power adapters having various supply voltages may be connected to the connector 110.

According to an embodiment of the present disclosure, the connector 110 may be a micro universal serial bus (USB) connector. By the change of the operation mode of the charging and discharging module 130, the electronic device 100 may charge the high voltage battery 140 by using the connector 110.

The control module 120 may identify the external device 101 connected to the connector 110 and control the operation of the charging and discharging module 130 according to the identification result. For example, the control module 120 may identify the type of the external device 101 connected through the connector 110. For example, the control module 120 may identify whether the device connected to the connector 110 is a power supply device supplying power or a power consumption device.

According to various embodiments of the present disclosure, the control module 120 may identify the external device 101 connected to the connector 110 through communication with the external device 101. The control module 120 may identify the supply voltage or operating voltage of the external device 101 connected to the connector 110 through the communication with the external device 101. Various embodiments related to this will be discussed by referring to FIG. 3.

When the power supply device is connected to the connector 110, the control module 120 may enable the charging and discharging module 130 to charge the battery 140 by using the supply voltage. Alternatively, if the power consumption device is connected to the connector 110, the control module 120 may enable the charging and discharging module 130 to supply the battery voltage in the opposite direction to the way charging is performed (in the opposite direction to the direction of the current when charging is performed).

According to various embodiments of the present disclosure, the control module 120 may identify the supply voltage or operating voltage of the external device 101 connected through the connector 110. For example, when the power supply device is connected through the connector 110, the control module 120 may identify whether the power supply device supplies a supply voltage of 5 V or a supply voltage of 9V. Alternatively, the control module 120 may identify whether the power supply device may supply a plurality of supply voltages. The control module 120 may change the operation mode of the charging and discharging module 130 based on the value of the supply voltage of the power supply device connected to the connector 110. See FIGS. 8 to 10 for reference.

According to an embodiment of the present disclosure, the control module 120 may operate as a portion of an application processor (AP) that controls the overall operations of the electronic device 100.

According to an embodiment of the present disclosure, the control module 120 may operate as a processor separate from the AP.

According to an embodiment of the present disclosure, at least a portion of the control module 120 may be included in the charging and discharging module 130. See FIGS. 2, 4, and 8 to 10 for reference.

The charging and discharging module 130 may change an operation mode according to a control signal received from the control module 120. By an operation mode change, the charging and discharging module may charge the battery 140 connected to the charging and discharging module 130 or supply a battery voltage to the external device 101. For example, the control signal may be a control signal generated by the connection of the power supply device or a control signal generated by the power consumption device. Alternatively, the control signal may be a control signal generated by the identification result of the external device 101 through the communication with the external device 101. According to various embodiments of the present disclosure, the charging and discharging module 130 may be implemented in a separate integrated circuit (IC), block, logic, etc. For example, the charging and discharging module 130 may be configured in a module in which the voltage conversion unit 131 and the charging and discharging unit 132 are coupled in terms of circuit.

According to an embodiment of the present disclosure, when a power supply device supplying a voltage higher than the battery voltage of the battery 140 is connected to the connector 110, the charging and discharging module 130 may operate in bypass-buck operation mode. The operation modes may respectively represent the operation states of the voltage conversion unit 131 and the charging and discharging unit 132 that are included in the charging and discharging module 130. In the bypass-buck operation mode, the voltage conversion unit 131 may bypass an input voltage input to the charging and discharging module 130 and the charging and discharging unit 132 may operate as a buck converter that converts a bypassed voltage according to the battery voltage of the battery 140. The electronic device 100 may use the power supply device to charge the battery 140.

According to an embodiment of the present disclosure, when a power supply device supplying a voltage lower than the battery voltage of the battery 140 is connected to the connector 110, the charging and discharging module 130 may operate in boost-buck operation mode. In the boost-buck operation mode, the voltage conversion unit 131 may boost an input voltage input to the charging and discharging module 130 and the charging and discharging unit 132 may operate as a buck converter that converts a boosted voltage according to the battery voltage of the battery 140. The electronic device 100 may use the power supply device to charge the battery 140.

According to an embodiment of the present disclosure, when a power consumption device consuming power is connected to the connector 110, the charging and discharging module 130 may operate in a buck-bypass operation mode. In the buck-bypass operation mode, the charging and discharging module 130 operates in the opposite direction to the way charging is performed (in the opposite direction to the direction of the current when charging is performed). The charging and discharging module 130 may bypass a battery voltage and the voltage conversion unit 131 may operate as a buck converter that converts the bypassed voltage according to the operating voltage of the power consumption device. The electronic device 100 may supply power to the power consumption device connected to the connector 110.

The voltage conversion unit 131 may convert a voltage according to the control signal from the control module 120. When the voltage conversion unit 131 receives a control signal by the connection of the power supply device, the voltage conversion unit 131 may bypass or boost an input voltage. When the voltage conversion unit 131 receives a control signal by the connection of the power consumption device, the voltage conversion unit 131 may convert the battery voltage of the battery 140 connected to the electronic device 100 in the opposite direction to the way a voltage is converted, to supply a converted voltage to the power consumption device.

According to an embodiment of the present disclosure, when a power supply device such as a power adapter is connected to the connector 110, the voltage conversion unit 131 may bypass or boost the supply voltage supplied from the power supply device, according to the value of the supply voltage.

For example, the voltage conversion unit 131 may bypass the supply voltage when the value of the supply voltage is equal to or higher than a set voltage value. Alternatively, the voltage conversion unit 131 may boost the supply voltage when the value of the supply voltage is lower than the set voltage value. The set voltage value may be a minimum chargeable voltage according to the battery 140 connected to the electronic device 100. When the value of the supply voltage is lower than the set voltage value, the voltage conversion unit 131 may boost a supply voltage to the minimum chargeable voltage according to the battery 140.

According to an embodiment of the present disclosure, when a power consumption device such as a USB on-the-go (USB OTG) device is connected to the connector 110, the voltage conversion unit 131 may convert the battery voltage to the operating voltage of the power consumption device.

The charging and discharging unit 132 may charge the battery or bypass a battery voltage, according to the control signal from the control module 120. For example, when the charging and discharging unit 132 receives a control signal by the connection of the power supply device, the charging and discharging unit 132 may receive the bypassed or boosted voltage from the voltage conversion unit 131 and step down the bypassed or boosted voltage according to a battery voltage to charge the battery 140. Alternatively, when the charging and discharging unit 132 receives a control signal by the connection of a power consumption device, the charging and discharging unit 132 may bypass the battery voltage of the battery 140 to the voltage conversion unit 131 in the opposite direction to the direction of current when the charging is performed.

The battery 140 may supply power to the electronic device 100. Also, the battery 140 may be charged through the charging and discharging module 130 of the electronic device 100. Although FIG. 1 shows that the battery 140 is detachable from the electronic device 100, the present disclosure is not limited thereto and the battery 140 may be integrated into the electronic device 100. See FIG. 4 for reference.

According to an embodiment of the present disclosure, the battery 140 may be a serial cell battery. For example, the battery 140 may be obtained by connecting two battery cells in series. For example, when it is assumed that the battery voltage of a battery using a battery cell is about 3.4 V to about 4.2 V, the battery obtained by connecting the two battery cells in series may have a battery voltage of about 6.8 V to about 8.6 V. Even though the battery voltage of the battery 140 increases, the electronic device 100 may identify the external device 101 connected to the connector 110 and change the operation mode of the charging and discharging module 130 according to an identification result. By changing the operation mode of the charging and discharging module 130 according to the external device 101 connected, the electronic device 100 may support all external devices 101 capable of being connected to the electronic device 100, such as a typical power adapter, high-voltage power adapter and USB OTG device.

Alternatively, the electronic device 100 may use a serial cell battery obtained by connecting three or more battery cells in series. The total battery voltage may increase depending on the number of battery cells connected in series. The present disclosure is not limited thereto, and the electronic device 100 may use the battery 140 including a battery cell or a plurality of battery cells connected in parallel.

The external device 101 may be connected to the external device 101 through the connector 110. The external device 101 may include a power supply device such as a power adapter, or a power consumption device such as a USB device.

When the external device 101 is a power supply device, the voltage conversion unit 131 may bypass or boost the supply voltage and the charging and discharging unit 132 may step down a bypassed or boosted voltage to charge the battery 140.

When the external device 101 is a power consumption device, the charging and discharging unit 132 may bypass the battery voltage to the voltage conversion unit 131, and the voltage conversion unit 131 may convert a bypassed battery voltage to supply the converted voltage to the power consumption device.

According to an embodiment of the present disclosure, the external device 101 may be an adaptive power adapter that may supply a supply voltage and current to the electronic device 100 according to a request from the electronic device 100. The adaptive power adapter may change the supply voltage and current based on the situation to supply the changed voltage and current to the electronic device 100. The electronic device 100 may request desired voltage and current values through the communication (connection) with the adaptive power adapter and the adaptive power adapter may supply a voltage and current according to the request from the electronic device 100.

The control module 120 may identify that the external device 101 connected to the connector 110 is the adaptive power adapter. For example, the control module 120 may identify a supply voltage supplied from the adaptive power adapter through the communication with the adaptive power adapter. The control module 120 may transmit a control signal to the charging and discharging module 130 according to an identification result. For example, when the adaptive power adapter supplies a voltage lower than the battery voltage of the battery 140, the charging and discharging module 130 may operate in a boost-buck operation mode. Alternatively, when the adaptive power adapter supplies a voltage higher than the battery voltage of the battery 140, the charging and discharging module 130 may operate in a bypass-buck operation mode.

According to an embodiment of the present disclosure, the external device 101 may be a power adapter that supplies a voltage lower than the battery voltage of the battery 140 connected. For example, when the electronic device 100 uses the battery 140 having a battery voltage of about 6.8 V to about 8.4 V, there may be a case where a 5 V power adapter is connected to the connector 110. The control module 120 may identify that the external device 101 connected to the connector 110 is a power adapter, and identify a supply voltage that the power adapter supplies. The control module 120 may transmit a control signal according to an identification result to the charging and discharging module 130. The charging and discharging module 130 may operate in a boost-buck operation mode based on the control signal.

According to an embodiment of the present disclosure, the external device 101 may be a power adapter that supplies a voltage higher than the battery voltage of the battery 140 connected. For example, when the electronic device 100 uses the battery 140 having a battery voltage of about 6.8 V to about 8.4 V, there may be a case where a 20 V power adapter is connected to the connector 110. The control module 120 may identify that the external device 101 connected to the connector 110 is a power adapter, and identify a supply voltage that the power adapter supplies. The control module 120 may transmit a control signal according to an identification result to the charging and discharging module 130. The charging and discharging module 130 may operate in a bypass-buck operation mode by the control signal.

As described above, if the external device 101 is a power supply device supplying power, the operation mode of the charging and discharging module 130 may be changed depending on the value of the supply voltage of the power adapter.

According to an embodiment of the present disclosure, the external device 101 may be a USB OTG device functionally connectable to the electronic device 100. The USB OTG device may use the battery voltage of the electronic device 100 for operation. When the control module 120 identifies that the external device 101 connected to the connector 110 is the USB OTG device, the charging and discharging module 130 may operate in a buck-bypass operation mode by the control signal received from the control module 120. The charging and discharging module 130 may supply a battery voltage to the USB OTG device in the opposite direction to the way charging is performed (in the opposite direction to the direction of current when charging is performed).

Figure 2:
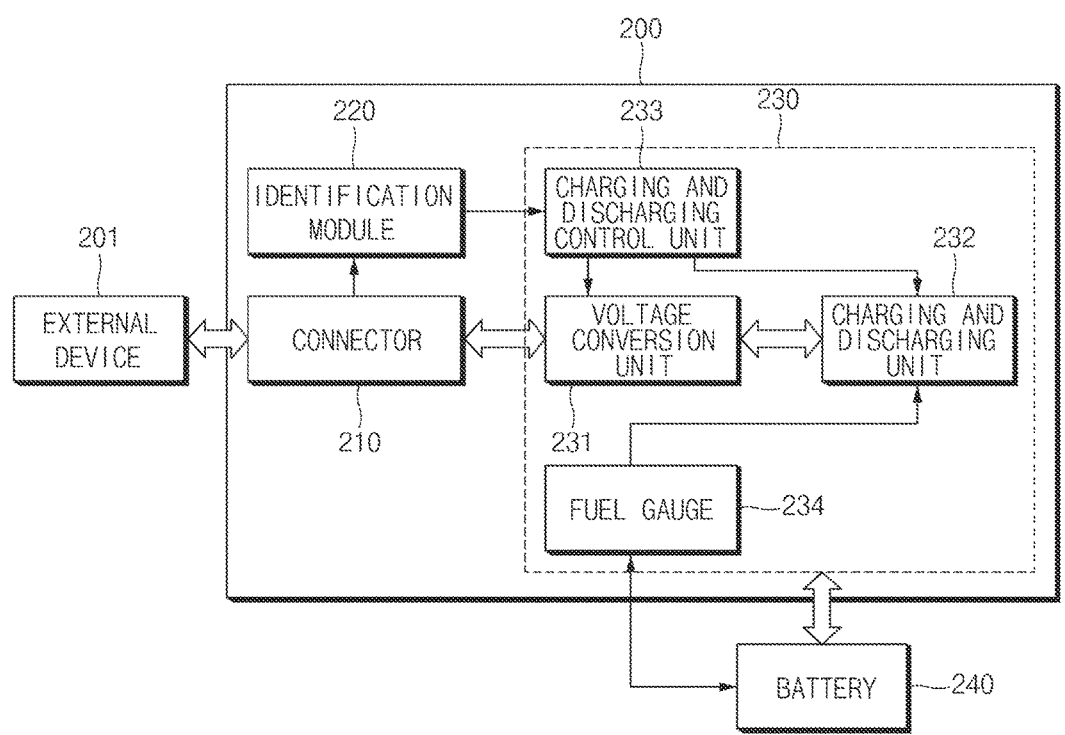
FIG. 2 shows a block diagram of an electronic device according to various embodiments of the present disclosure.

FIG. 2 shows a block diagram of an electronic device according to various embodiments of the present disclosure.

Referring to FIG. 2, an electronic device 200 may include a connector 210, an identification module 220, and a charging and discharging module 230. The charging and discharging module 230 according to the present embodiment may include a voltage conversion unit 231, a charging and discharging unit 232, a charging and discharging control unit 233, and a fuel gauge 234.

In order to prevent the characteristic of the present embodiment from becoming obscure, only elements related to the present embodiment are herein described. Thus, a person skilled in the art to which the present embodiment pertains may understand that other general elements in addition to the elements as shown in FIG. 2 may be further included.

Unlike the electronic device 100 as shown in FIG. 1, the electronic device 200 may identify the external device 201 connected to the electronic device 200, at the identification module 220. An identification result obtained from the identification module 220 may be transmitted to the charging and discharging module 230 directly or through a main control module (not shown) (e.g., AP). For example, the identification module 220 and the charging and discharging control unit 233 may correspond to the control module 120 as shown in FIG. 1.

Since the charging and discharging module 230 in FIG. 2 includes the charging and discharging control unit 233, it is possible to change the operation modes of the voltage conversion unit 231 and the charging and discharging unit 232 through the charging and discharging control unit 233. According to various embodiments of the present disclosure, the charging and discharging module 230 in FIG. 2 may further include the fuel gauge 234.

According to various embodiments of the present disclosure, the electronic device 100 in FIG. 1 may include the charging and discharging module 230 in FIG. 2 instead the charging and discharging module 130.

The connector 210 may connect the external device 201 to the electronic device 200. Various types of external device 201 such as a power adapter or USB device may be connected to the connector 210. For example, power adapters having various supply voltages may be connected to the connector 210.

The identification module 220 may identify the external device 201 connected to the connector 210. The identification module 220 may identify the type of the external device 201 connected through the connector 210. For example, the identification module 220 may identify whether the device connected to the connector 210 is a power supply device supplying power or a power consumption device.

Alternatively, the identification module 220 may identify the supply voltage or operating voltage of the external device 201. For example, if the power supply device is connected through the connector 210, the identification module 220 may identify whether the power supply device supplies a supply voltage of 5 V or a supply voltage of 9 V. Alternatively, the identification module 220 may identify whether the power supply device may supply a plurality of supply voltages.

For example, the identification module 220 may operate as a portion of a main control module (not shown) that controls the overall operations of the electronic device 200.

The charging and discharging module 230 may change an operation mode according to a control signal received from the charging and discharging control unit 233. By an operation mode change, the charging and discharging module 230 may charge the battery 240 connected to the charging and discharging module 230 or supply a battery voltage to the external device 201. For example, the control signal may be a control signal generated by the connection of the power supply device or a control signal generated by the connection of the power consumption device.

According to an embodiment of the present disclosure, when a power supply device supplying a voltage higher than the battery voltage of the battery 240 is connected to the connector 210, the charging and discharging module 230 may operate in a bypass-buck operation mode. The operation modes may respectively represent the operation states of the voltage conversion unit 231 and the charging and discharging unit 232 that are included in the charging and discharging module 230. In the bypass-buck operation mode, the voltage conversion unit 231 may bypass an input voltage input to the charging and discharging module 230 and the charging and discharging unit 232 may operate as a buck converter that converts a bypassed voltage according to the battery voltage of the battery 240. The electronic device 200 may use the power supply device to charge the battery 240.

According to an embodiment of the present disclosure, when a power supply device supplying a voltage lower than the battery voltage of the battery 240 is connected to the connector 210, the charging and discharging module 230 may operate in a boost-buck operation mode. In the boost-buck operation mode, the voltage conversion unit 231 may boost an input voltage input to the charging and discharging module 230 and the charging and discharging unit 232 may operate as a buck converter that converts a boosted voltage according to the battery voltage of the battery 240. The electronic device 200 may use the power supply device to charge the battery 240.

According to an embodiment of the present disclosure, when a power consumption device consuming power is connected to the connector 210, the charging and discharging module 230 may operate in a buck-bypass operation mode. In the buck-bypass operation mode, the charging and discharging module 230 operates in the opposite direction to the way charging is performed (in the opposite direction to the direction of current when charging is performed). The charging and discharging module 230 may bypass a battery voltage and the voltage conversion unit 231 may operate as a buck converter that converts the bypassed voltage according to the operating voltage of the power consumption device. The electronic device 200 may supply power to the power consumption device connected to the connector 210.

The voltage conversion unit 231 may convert a voltage according to a control signal from the charging and discharging control unit 233. When the voltage conversion unit 231 receives a control signal by the connection of the power supply device, the voltage conversion unit 231 may bypass or boost an input voltage. When the voltage conversion unit 231 receives a control signal by the connection of the power consumption device, the voltage conversion unit 231 may convert the battery voltage of the battery 240 connected to the electronic device 200 in the opposite direction to the way the voltage is converted (in the opposite direction to the direction of current), to supply a converted voltage to the power consumption device.

According to an embodiment of the present disclosure, when a power supply device such as a power adapter is connected to the connector 210, the voltage conversion unit 231 may bypass or boost the supply voltage supplied from the power supply device, according to the value of the supply voltage. For example, the voltage conversion unit 231 may bypass the supply voltage when the value of the supply voltage is equal to or higher than a set voltage value. Alternatively, the voltage conversion unit 231 may boost the supply voltage when the value of the supply voltage is lower than the set voltage value. The set voltage value may be a minimum chargeable voltage according to the battery 240 connected to the electronic device 200. When the value of the supply voltage is lower than the set voltage value, the voltage conversion unit 231 may boost a supply voltage to the minimum chargeable voltage according to the battery 240.

According to an embodiment of the present disclosure, when a power consumption device such as a USB OTG device is connected to the connector 210, the voltage conversion unit 231 may convert the battery voltage into the operating voltage of the power consumption device.

The charging and discharging unit 232 may charge the battery 240 or bypass a battery voltage, according to a control signal from the charging and discharging control unit 233. For example, when the charging and discharging unit 232 receives a control signal by the connection of the power supply device, the charging and discharging unit 232 may receive the bypassed or boosted voltage from the voltage conversion unit 231 and step down the bypassed or boosted voltage according to a battery voltage to charge the battery 240. Alternatively, when the charging and discharging unit 232 receives a control signal by the connection of a power consumption device, the charging and discharging unit 232 may bypass the battery voltage of the battery 240 to the voltage conversion unit 231 in the opposite direction to the way charging is performed (in the opposite direction to the direction of current when charging is performed).

The charging and discharging control unit 233 may receive an identification result from the identification module 220 and control the operation of the voltage conversion unit 231 or the charging and discharging unit 232 according to the identification result. The charging and discharging control unit 233 may transmit a control signal to the voltage conversion unit 231 or the charging and discharging unit 232.

When the power supply device is connected to the connector 210, the charging and discharging control unit 233 may enable the voltage conversion unit 231 or the charging and discharging unit 232 to charge the battery 240 by using the supply voltage. Alternatively, when the power consumption device is connected to the connector 210, the charging and discharging control unit 233 may control the voltage conversion unit 231 or the charging and discharging unit 232 in order to supply the battery voltage to the power consumption device in the opposite direction to the way charging is performed (to the direction of current when charging is performed). Alternatively, the charging and discharging control unit 233 may change the operating mode of the voltage conversion unit 231 or the charging and discharging unit 232 according to the value of the supply voltage of the power supply device connected to the connector 210.

The fuel gauge 234 may sense the capacity of the battery 240. The fuel gauge 234 may provide a notification of a battery level according to the usage of the electronic device 200, to the charging and discharging control unit 233.

According to various embodiments of the present disclosure, the charging and discharging module 230 may further include a battery protection circuit (not shown).

The battery 240 may supply power to the electronic device 200. Also, the battery 240 may be charged through the charging and discharging module 230 of the electronic device 200. According to an embodiment of the present disclosure, the battery 240 may be detachable from the electronic device 200. According to an embodiment of the present disclosure, the battery 240 may be integrated into the electronic device 200.

According to an embodiment of the present disclosure, the battery 240 may be a serial cell battery. For example, the battery 240 may be obtained by connecting two or more battery cells in series. The total battery voltage may increase depending on the number of battery cells connected in series. The present disclosure is not limited thereto, and the electronic device 200 may also use the battery 240 including a battery cell or a plurality of battery cells connected in parallel.

The external device 201 may be connected to the electronic device 200 through the connector 210. The external device 201, such as a power supply device including a power adapter or a power consumption device including a USB device may be connected to the electronic device 200 through the connector 210.

When the external device 201 is a power supply device (e.g., power adapter or adaptive power adapter), the voltage conversion unit 231 may bypass or boost the supply voltage and the charging and discharging unit 232 may step down a bypassed or boosted voltage to charge the battery 240.

When the external device 201 is a power consumption device (e.g., USB OTG device), the charging and discharging unit 232 may bypass the battery voltage to the voltage conversion unit 231 and the voltage conversion unit 231 may convert the bypassed battery voltage to supply the converted voltage to the power consumption device.

The electronic device 200 according to various embodiments of the present disclosure may be compatible with a typical power adapter and USB device and provide the charging and discharging module 230 that may charge a high-voltage, large capacity battery. The electronic device 200 may charge the battery 240 having a battery voltage higher than the supply voltage of a typical power adapter with the power adapter. Also, the electronic device 200 may also be compatible with a power adapter providing a supply voltage higher than the battery voltage. In addition, the electronic device 200 may supply a battery voltage to a USB device connected to the electronic device 200 to operate the USB device.

According to various embodiments of the present disclosure, the charging and discharging module may be implemented in a separate IC, element, device, etc. Accordingly, when the charging and discharging module receives, from the identification module 220, an identification result obtained by identifying the external device 201 connected to the connector 210, the charging and discharging control unit 233 may transmit a control signal to the voltage conversion unit 231 and the charging and discharging unit 232. When the voltage conversion unit 231 receives a control signal by the connection of the power supply device, the voltage conversion unit 231 may bypass or boost the supply voltage according to the value of the supply voltage.

For example, when a control signal from the charging and discharging control unit 233 is a control signal by the connection of a power supply device having a supply voltage equal to or higher than a set voltage value, the voltage conversion unit 231 may bypass the supply voltage. Alternatively, when the control signal from the charging and discharging control unit 233 is a control signal by the connection of a power supply device having a supply voltage lower than a set voltage value, the voltage conversion unit 231 may boost the supply voltage.

When the charging and discharging unit 232 receives the control signal by the connection of the power supply device, the charging and discharging unit 232 may step down a voltage supplied from the voltage conversion unit 231 according to a battery voltage to charge the battery.

Alternatively, when the voltage conversion unit 231 receives a control signal by the connection of the power consumption device, the charging and discharging unit 232 may bypass the battery voltage of the battery 240 to the voltage conversion unit 231. The voltage conversion unit 231 may convert the bypassed battery voltage and supply the converted voltage to the power consumption device.

Figure 3:
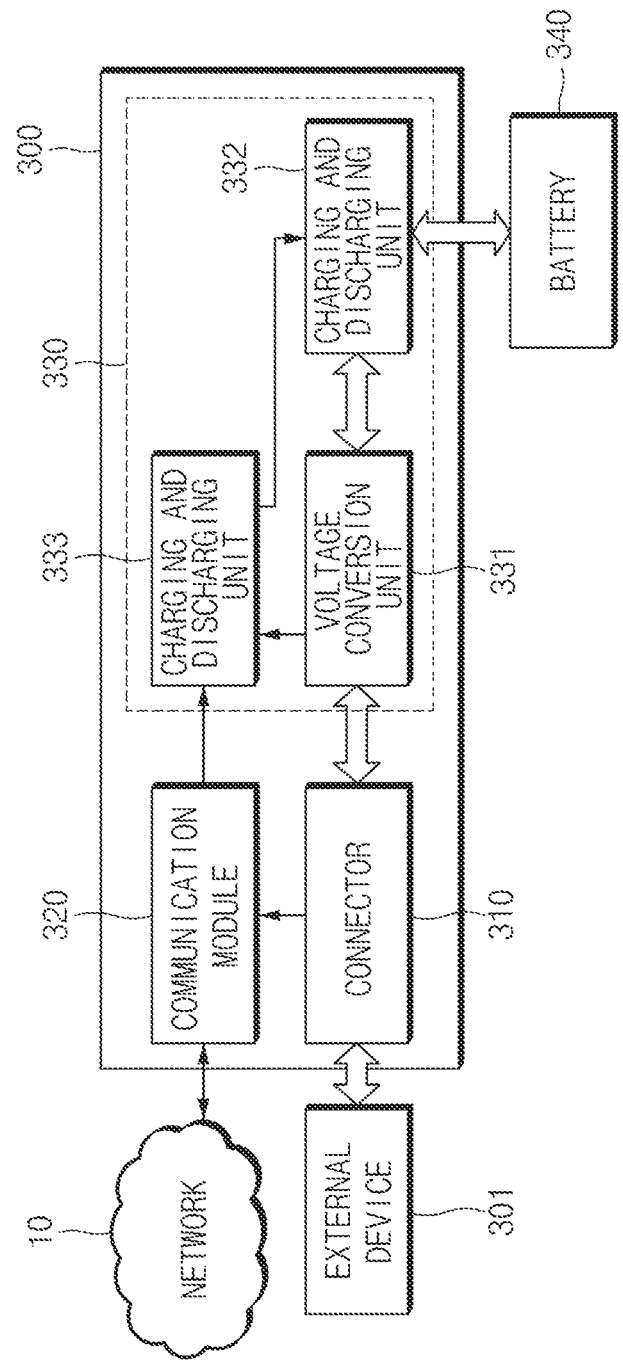
FIG. 3 shows a block diagram of an electronic device according to various embodiments of the present disclosure.

FIG. 3 shows a block diagram of an electronic device according to various embodiments of the present disclosure.

Referring to FIG. 3, an electronic device 300 may include a connector 310, a communication module 320, and a charging and discharging module 330. The charging and discharging module 330 according to an embodiment of the present disclosure may include a voltage conversion unit 331, a charging and discharging unit 332, and a charging and discharging control unit 333. Since the voltage conversion unit 331, the charging and discharging unit 332, and the charging and discharging control unit 333 in FIG. 3 correspond to the voltage conversion unit 231, the charging and discharging unit 232, and the charging and discharging control unit 233 in FIG. 2, their repeated descriptions are omitted.

In order to prevent the characteristic of the present embodiment from becoming obscure, only elements related to the present embodiment are herein described. Thus, a person skilled in the art to which the present embodiment pertains may understand that other general elements in addition to the elements as shown in FIG. 3 may be further included.

Unlike the electronic device 100 in FIG. 1, the electronic device 300 may identify an external device 301 or a supply voltage supplied from the external device 301 through the communication module 320.

The connector 310 may connect the external device 301 to the electronic device 300. Various types of external device 301 such as a power adapter or USB device may be connected to the connector 310. For example, power adapters having various supply voltages may be connected to the connector 310.

The communication module 320 may perform communication with the external device 301. The communication module 320 may identify the external device 301 connected to the electronic device 300 through the communication with the external device 301. For example, the communication module 320 may identify the type of the external device 301 connected to the electronic device 300.

For example, the communication module 320 may identify through the communication with the external device 301 whether the external device 301 connected to the electronic device 300 is a power adapter. Alternatively, the communication module 320 may identify the supply voltage or operating voltage of the external device 301 through the communication with the external device 301 to transmit a control signal to the charging and discharging module 330. Alternatively, the communication module 320 may transmit, to the external device 301, information on a voltage and current needed for the electronic device 300. Alternatively, the communication module 320 may receive, from the external device 301, information on the voltage and current that the external device 301 may supply.

The information obtained by the communication module 320 and transmitted and received to and from the external device 301 may be transmitted to the charging and discharging module 330 directly or through a main control module (not shown) (e.g., AP). For example, the communication module 320 and the charging and discharging control unit 333 may correspond to the control module 120 in FIG. 1.

According to various embodiments of the present disclosure, the communication module 320 may operate as a portion of a main control module (not shown) (e.g., AP) that controls the overall operations of the electronic device 300.

According to an embodiment of the present disclosure, the external device 301 connected to the electronic device 300 may be an adaptive power adapter that may perform communication with the electronic device 300 to supply a proper voltage and current according to the state of the electronic device 300. The adaptive power adapter may be a power adapter that may change a supply voltage and current through the communication with the electronic device 300 to supply a changed supply voltage and current to the electronic device 300. For example, the communication module 320 may perform the communication with the external device 301 and identify whether the external device 301 connected to the electronic device 300 is the adaptive power adapter.

The electronic device 300 may transmit information on a voltage and current needed for the electronic device 300 to the external device 301 through the communication module 320. The adaptive power adapter may transmit, to the electronic device 300, information on a voltage and current that the external device 301 may supply. The communication module 320 may provide, to the charging and discharging module 330, information on the voltage and current supplied by the external device, based on the communication with the external device 301. The charging and discharging control unit 333 of the charging and discharging module 330 may transmit a control signal to the voltage conversion unit 331 or the charging and discharging unit 332, based on the information on the voltage and current that the external device 301 supplies.

For example, when the adaptive power adapter supplies a voltage lower than the battery voltage of the battery 340, the charging and discharging control unit 333 may control the voltage conversion unit 331 based on information received from the communication module 320 so that the voltage conversion unit 331 boosts an input voltage. The charging and discharging control unit 333 may control the charging and discharging unit 332 based on the information received from the communication module 320 so that the charging and discharging unit 332 lowers a boosted voltage according to a battery voltage.

Alternatively, when the adaptive power adapter supplies a voltage higher than the battery voltage of the battery 340, the charging and discharging control unit 333 may control the voltage conversion unit 331 based on the information received from the communication module 320 so that the voltage conversion unit 331 bypasses the input voltage. The charging and discharging control unit 333 may control the charging and discharging unit 332 based on the information received from the communication module 320 so that the charging and discharging unit 332 lowers a bypassed voltage according to a battery voltage.

According to an embodiment of the present disclosure, the communication module 320 may transmit and receive data through a wired or wireless network 10 or through wired serial communication to, for example, external device 301. In this case, the network 10 includes internet, a Local Area Network (LAN), a Wireless LAN (WLAN), a Wide Area Network (WAN), a Personal Area Network (PAN), etc. but is not limited thereto. Also, a person skilled in the art to which the present embodiment pertains may appreciate that the network may also be other types of network that may transmit and receive information.

According to an embodiment of the present disclosure, the communication module 320 may use a short-range communication technology to transmit and receive data to and from the external device 301. The short-range communication technology according to the present embodiment may include Bluetooth, Radio Frequency Identification (RFID), infrared data association (IrDA), ultra wideband (UWB), ZigBee, and WiFi direct (WFD), Near Field Communication (NFC), etc.

The charging and discharging module 330 may change an operation mode according to a control signal received from the charging and discharging control unit 333. The voltage conversion unit 331 may convert a voltage according to a control signal from the charging and discharging control unit 333. The charging and discharging unit 332 may charge the battery 340 or bypass a battery voltage, according to a control signal from the charging and discharging control unit 333.

The charging and discharging control unit 333 may receive information that the communication module 320 has transmitted and received and to and from the external device 301, and control the operation of the voltage conversion unit 331 or charging and discharging unit 332 according to the information. The charging and discharging control unit 333 may transmit a control signal to the voltage conversion unit 331 or the charging and discharging unit 332.

According to various embodiments of the present disclosure, the charging and discharging module 330 may be implemented in a separate IC, element, device, etc.

According to various embodiments of the present disclosure, the charging and discharging module 330 may further include a fuel gauge (not shown) or batter protection circuit (not shown).

The battery 340 may supply power to the electronic device 300. Also, the battery 340 may be charged through the charging and discharging module 330 of the electronic device 300. According to an embodiment of the present disclosure, the battery 340 may be detachable from the electronic device 300. According to an embodiment of the present disclosure, the battery 340 may be integrated into the electronic device 300.

According to various embodiments of the present disclosure, the battery 340 may be a serial cell battery. In addition, the battery 340 may be a battery that includes a battery cell or a plurality of battery cells connected in parallel.

The external device 301 may be connected to the electronic device 300 through the connector 310. The external device 301 may perform communication with the electronic device 300.

Figure 4:
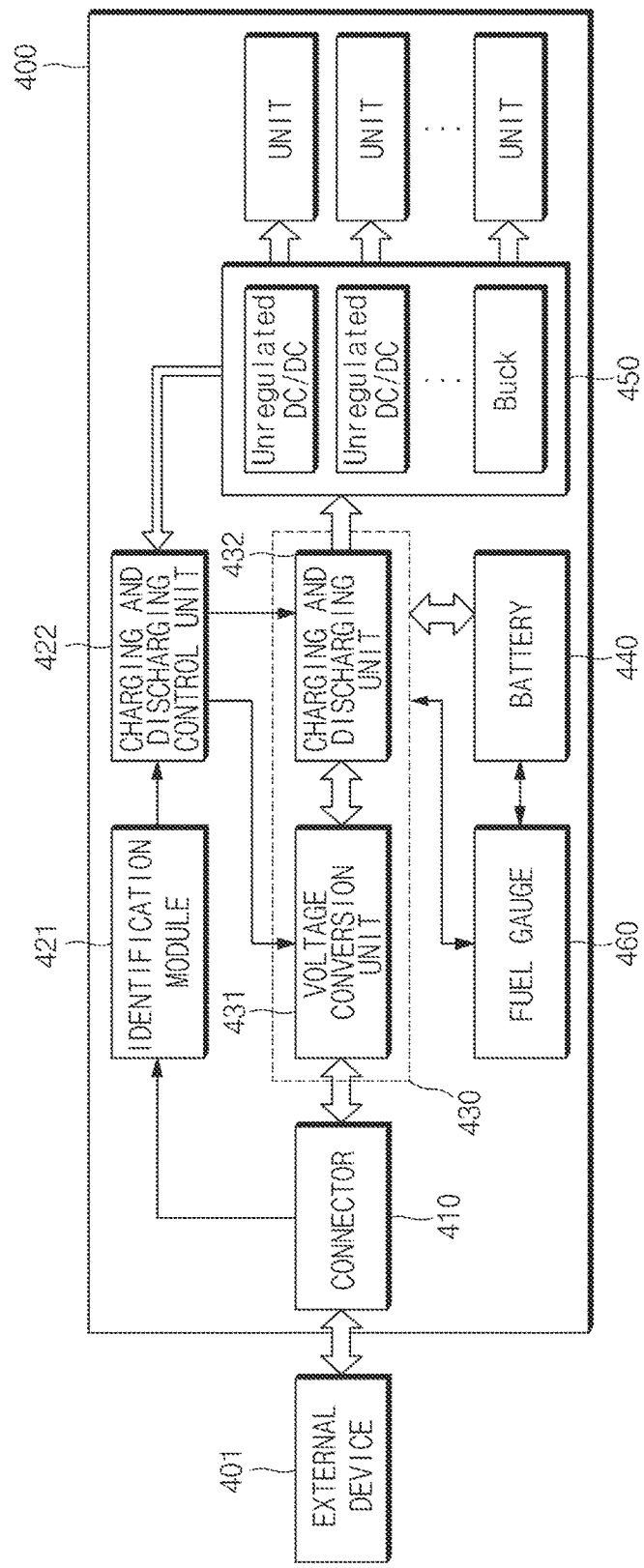
FIG. 4 shows a block diagram of an electronic device according to various embodiments of the present disclosure.

FIG. 4 shows a block diagram of an electronic device according to various embodiments of the present disclosure.

Referring to FIG. 4, the electronic device 400 may include a connector 410, an identification module 421, a charging and discharging control module 422, a charging and discharging module 430, a power management module 450, a fuel gauge 460, and other units. The charging and discharging module 430 may include a voltage conversion unit 431 and a charging and discharging unit 432.

In order to prevent the characteristic of the present embodiment from becoming obscure, only elements related to the present embodiment are herein described. Thus, a person skilled in the art to which the present embodiment pertains may understand that other general elements in addition to the elements as shown in FIG. 4 may be further included.

Unlike the electronic device 100 as shown in FIG. 1, the electronic device 400 may identify the external device 401 connected through the connector 410, at the identification module 421. An identification result obtained from the identification module 421 may be transmitted to the charging and discharging module 430 through the charging and discharging control module 422. The identification module 421 and the charging and discharging control module 422 may correspond to the control module 120 as shown in FIG. 1. At least one of the identification module 421 and charging and discharging control module 422 may operate as a portion of a main control module (not shown) (e.g., AP).

The connector 410 may connect the external device 401 to the electronic device 400. Various types of external device 401 such as a power adapter or USB device may be connected to the connector 410. For example, power adapters having various supply voltages may be connected to the connector 410.

The identification module 421 may identify the external device 401 connected to the connector 410. The identification module 421 may identify the type of the external device 401 connected through the connector 410. Alternatively, the identification module 421 may identify the supply voltage or operating voltage of the external device 401.

The charging and discharging control module 422 may control the operation of the charging and discharging module 430 according to the identification result from the identification module 421. The charging and discharging control module 422 may transmit a control signal to the charging and discharging module 430.

When a power supply device is connected to the connector 410, the charging and discharging control module 422 may enable the charging and discharging module 430 to charge the battery 440 by using the supply voltage. Alternatively, when a power consumption device is connected to the connector 410, the charging and discharging control module 422 may enable the charging and discharging module 430 to supply the battery voltage to the power consumption device in the opposite direction to the way charging is performed. Alternatively, the charging and discharging control module 422 may change the operation mode of the charging and discharging module 430 according to the value of the supply voltage of the power supply device connected to the connector 410.

The charging and discharging module 430 may change an operation mode according to a control signal received from the charging and discharging control module 422. The voltage conversion unit 431 may convert a voltage according to a control signal from the charging and discharging control module 422. The charging and discharging unit 432 may charge the battery 440 or bypass a battery voltage, according to the control signal from the charging and discharging control module 422. According to various embodiments of the present disclosure, the charging and discharging module 430 may further include a fuel gauge (not shown) or batter protection circuit (not shown). The battery 440 may supply power to the electronic device 400. Also, the battery 440 may be charged through the charging and discharging module 430 of the electronic device 400.

According to an embodiment of the present disclosure, the battery 440 may be detachable from the electronic device 400. According to an embodiment of the present disclosure, the battery 440 may be integrated into the electronic device 400. According to an embodiment of the present disclosure, the battery 440 may be a serial cell battery. The present disclosure is not limited thereto and the battery 440 may be a battery that includes a battery cell or a plurality of battery cells connected in parallel.

The power management module 450 may supply power to each unit of the electronic device 400. The power management module 450 may convert a battery voltage to be suitable for the operating voltage of each unit of the electronic device 400. The power management module 450 may include at least one regulator for the conversion of the battery voltage. According to various embodiments of the present disclosure, the power management module 450 may include a buck converter, low dropout regulator (LDO), boost converter, DC-DC regulator, switched regulator, etc.

According to an embodiment of the present disclosure, the power management module 450 may further include an unregulated DC/DC converter that lowers the battery voltage of the battery 440 to supply a voltage to each unit of the electronic device 400. For example, the power management module 450 may use a switched capacitor to step down a battery voltage to supply a voltage suitable for the operating voltage of each unit.

The fuel gauge 460 may sense the capacity of the battery 440. The fuel gauge 460 may provide a notification of a battery level according to the usage of the electronic device 400, to the charging and discharging control module 422.

The external device 401 may be connected to the electronic device 400 through the connector 410. The external device 401, such as a power supply device including a power adapter or a power consumption device including a USB device may be connected to the electronic device 400 through the connector 410.

Figure 5:
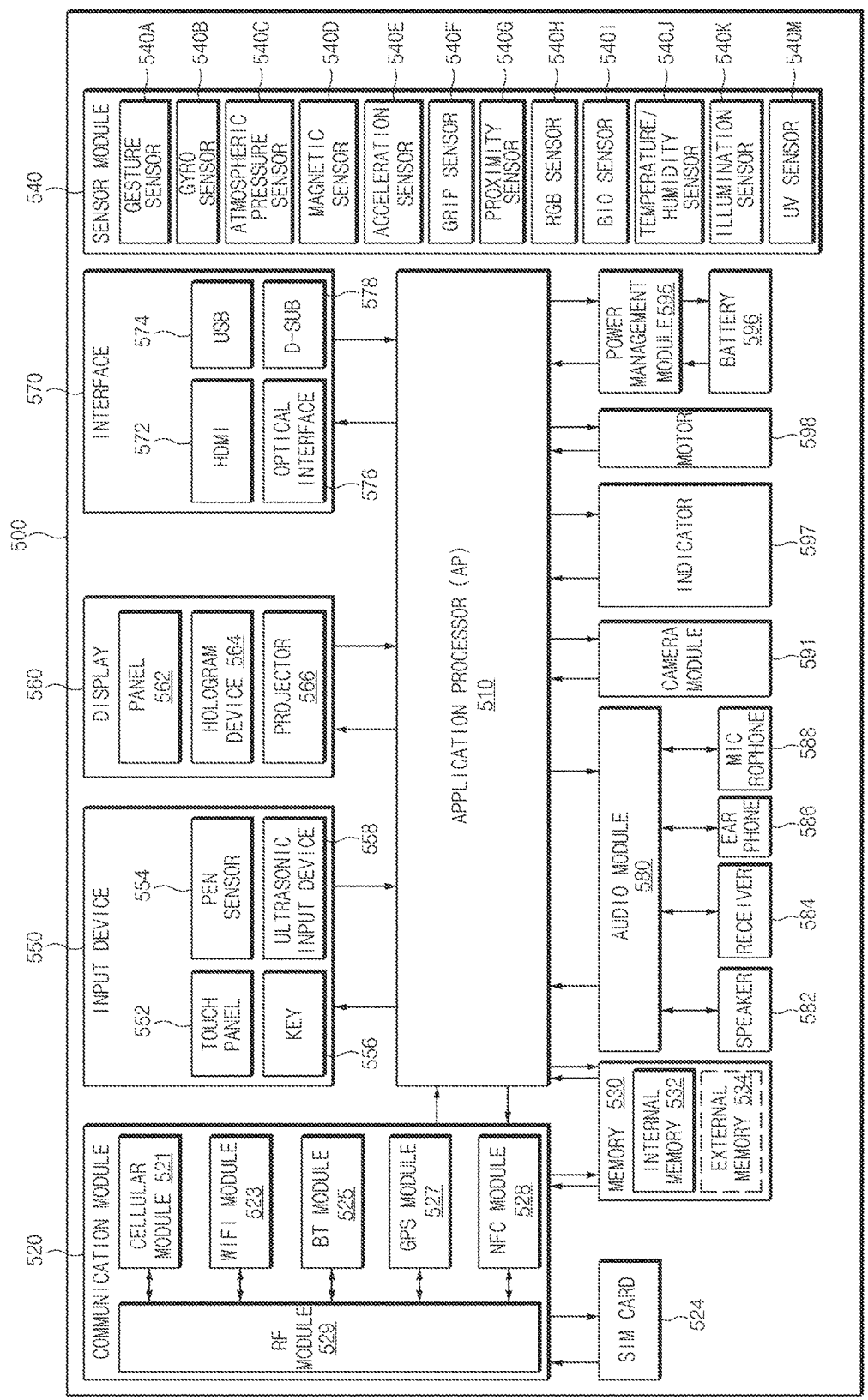
FIG. 5 shows a block diagram of an electronic device according to various embodiments of the present disclosure.

FIG. 5 shows a block diagram of an electronic device according to various embodiments of the present disclosure.

Referring to FIG. 5, the electronic device 500 may include at least one AP 510, a communication module 520, a subscriber identification module (SIM) card 524, a memory 530, a sensor module 540, an input device 550, a display module 560, an interface 570, an audio module 580, a camera module 591, a power management module 595, a battery 596, an indicator 597, and a motor 598.

The AP 510 may control a plurality of hardware or software components connected to the AP 510 and may also perform processing and operations on various pieces of data including multimedia data, by executing an operating system or an application program. The AP 510 may be implanted with a system on chip (SoC) for example. According to an embodiment of the present disclosure, the AP 510 may further include a graphic processing unit (GPU) (not shown).

The AP 510 may include an identification module identifying an external device connected to the electronic device 500, or a charging and discharging control module controlling charging according to information transmitted and received through the communication module 520. The identification module and the charging and discharging control module in the present embodiment may correspond to the identification module 421 and the charging and discharging control module 422 in FIG. 4. Descriptions that are omitted below but provided with respect to the identification module 421 and the charging and discharging control module 422 in FIG. 4 may be applied to the identification module and the charging and discharging module in FIG. 5. According to various embodiments of the present disclosure, the identification module may be located in a processor separate from the AP 510.

The identification module may identify the external device (not shown) connected through the connector (not shown) in FIG. 5. The charging and discharging control module may control the operation of the charging and discharging module (not shown) in the power management module 595 according to the information transmitted and received through the communication module 520 or the identification result from the identification module. Based on the identification result obtained through the identification from the identification module or the information transmitted and received through the communication module 520, it is possible to charge the battery or supply the battery voltage of the battery to the external device in the opposite direction to the way charging is performed.

The communication module 520 may perform data transmission and reception in communication between the electronic device 500 and other electronic devices (e.g., external device 301 in FIG. 3) connected through a network. According to an embodiment of the present disclosure, the communication module 520 may include a cellular module 521, a WiFi module 523, a BT module 525, a GPS module 527, an NFC module 528, and an RF module 529.

The cellular module 521 may provide a voice call, a video call, a text message service, or an Internet service through a communication network (e.g., LTE, LTE-A, CDMA, WCDMA, UMTS, WiBro or GSM network). Also, the cellular module 521 may use, for example, a SIM (e.g., SIM card 524) to perform the identification and authentication of an electronic device in a communication network. According to an embodiment of the present disclosure, the cellular module 521 may perform at least some of functions that the AP 510 may provide. For example, the cellular module 521 may perform at least some of multimedia control functions.

According to an embodiment of the present disclosure, the cellular module 521 may include a communication processor (CP). Also, the cellular module 521 may be implemented with an SoC, for example. FIG. 5 shows components such as the cellular module 521 (e.g., a communication processor), the memory 530 and the power management module 595 separately from the AP 510 but according to an embodiment of the present disclosure, the AP 510 may be implemented to include at least some (e.g., cellular module 521) of the above-described components.

According to an embodiment of the present disclosure, the AP 510 or the cellular module 521 (e.g., a CP) may load, on volatile memories, commands or data received from at least one of a non-volatile memory and another component connected to the AP 510 or the cellular module 521, to process the commands or data. Also, the AP 510 or the cellular module 521 may store, on non-volatile memories, data received from at least one of other components or generated by at least one of other components.

Each of the WiFi module 523, the BT module 525, the GPS module 527 and the NFC module 528 may include a processor for processing data transmitted and received through a corresponding module, for example. FIG. 5 shows each of the cellular module 521, the WiFi module 523, the BT module 525, the GPS module 527, and the NFC module 528 as a separate block, but according to an embodiment of the present disclosure, at least some (e.g., two or more) of the cellular module 521, the WiFi module 523, the BT module 525, the GPS module 527, and the NFC module 528 may be included in one IC or an IC package. For example, at least some (e.g., a communication processor corresponding to the cellular module 521 and a WiFi processor corresponding to the WiFi module 523) of processors corresponding to the cellular module 521, the WiFi module 523, the BT module 525, the GPS module 527, and the NFC module 528, respectively may be implemented with a single SoC.

The RF module 529 may perform data transmission and reception, for example, transmission and reception of an RF signal. The RF module 529 may include e.g., a transceiver, a power amp module (PAM), a frequency filter or a low noise amplifier (LNA) though not shown. Also, the RF module 529 may further include a part, such as a conductor or wire, for transmitting and receiving free-space electromagnetic waves when performing wireless communication. Although FIG. 5 shows that the cellular module 521, the WiFi module 523, the BT module 525, the GPS module 527, and the NFC module 528 share one RF module 529, at least one of the cellular module 521, the WiFi module 523, the BT module 525, the GPS module 527, and the NFC module 528 may also transmit and receive an RF signal through a separate RF module according to an embodiment of the present disclosure.

The SIM card 524 may be a card including a SIM and may be inserted into a slot that is formed at a specific location on an electronic device. The SIM card 524 may include unique identification information (e.g., an integrated circuit card identifier (ICCID)) or subscriber information (e.g., an international mobile subscriber identity (IMSI)).

The memory 530 may store a set of commands or a program routine used for identifying an external device connected to the electronic device 500 and controlling the charging and discharging module, at the identification module or the charging and discharging module. Also, the memory 530 may store data or programs used for controlling a voltage supplied to each unit through the AP 510 or the power management module 595.

The memory 530 may include an internal memory 532 or an external memory 534. The internal memory 532 may include at least one of e.g., a volatile memory (e.g., a Dynamic Random Access Memory (DRAM), a Static RAM (SRAM), or a Synchronous DRAM (SDRAM)) and a non-volatile memory (e.g., an One Time Programmable ROM (OTPROM), a PROM, an Erasable and Programmable ROM (EPROM), an Electrically Erasable and Programmable ROM (EEPROM), a mask ROM, a flash ROM, a NAND flash memory, or a NOR flash memory).

According to an embodiment of the present disclosure, the internal memory 532 may be a Solid State Drive (SSD). The external memory 534 may further include a flash drive, for example, a Compact Flash (CF) drive, a Secure Digital (SD) drive, a micro-SD drive, a mini-SD drive, or an extreme Digital (xD) drive, or a memory stick. The external memory 534 may be functionally connected to the electronic device 500 through various interfaces. According to an embodiment of the present disclosure, the electronic device 500 may further include a storage device (or storage medium) such as a Hard Disk Drive (HDD).

The sensor module 540 may measure a physical quantity or sense the operation state of the electronic device 500 to convert measured or sensed information into an electrical signal. The sensor module 540 may include at least one of a gesture sensor 540A, a gyro sensor 540B, an barometric pressure sensor 540C, a magnetic sensor 540D, an acceleration sensor 540E, a grip sensor 540F, a proximity sensor 540G, a color sensor 540H (e.g., a red/green/blue (RGB) sensor), a biometric sensor 540I, a temperature/humidity sensor 540J, an illumination sensor 540K or an ultra violet (UV) sensor 540M, for example. The temperature/humidity sensor 540J may detect the temperature of each unit.

Additionally or alternatively, the sensor module 540 may include, for example, (not shown) an olfactory (E-nose sensor), an Electromyography (EMG) sensor, an Electroencephalogram (EEG) sensor, an Electrocardiogram (ECG) sensor, an Infrared (IR) sensor, an iris sensor or a fingerprint sensor. The sensor module 540 may further include a control circuit for controlling at least one sensor that is included in the sensor module 540.

The input device 550 may include a touch panel 552, a (digital) pen sensor 554, a key 556 or an ultrasonic input device 558. The touch panel 552 may recognize a touch input by using at least one of capacitive, pressure-sensitive, infrared and ultrasonic techniques, for example. Also, the touch panel 552 may also further include a control circuit. In the case of the capacitive technique, a physical contact or proximity awareness is possible. The touch panel 552 may further include a tactile layer. In this case, the touch panel 552 may provide a user with a tactile response.

The (digital) pen sensor 554 may be implemented by using the same or similar method as that of obtaining a user's touch input or by using a separate sheet for recognition, for example. The key 556 may include, for example, a physical button, a touch key, an optical key or a keypad. The ultrasonic input device 558 is a device that enables the electronic device 500 to sense a sound wave with a microphone (e.g., microphone 588) to identify data, through an input tool generating an ultrasonic signal, and the ultrasonic input device 558 may thus perform wireless recognition. According to an embodiment of the present disclosure, the electronic device 500 may also use the communication module 520 to receive a user input from an external device (e.g., a computer or server) connected thereto.

The display module 560 may include a display driving module 562, a panel 564, a hologram device 566 or a projector 568. According to an embodiment of the present disclosure, the display driving module 562 may further include a control circuit for controlling the panel 564, the hologram device 566 or the projector 568. The panel 564 may be a liquid-crystal display (LCD) or an active-matrix organic light-emitting diode (AM-OLED), for example. The panel 564 may be flexible, transparent or wearable, for example. The panel 564 and the touch panel 552 may also be implemented into a single module. The hologram device 566 may use light interference to show a stereoscopic image in the air. The projector 568 may project light onto a screen to display an image. The screen may be located internal or external to the electronic device 500, for example.

The interface 570 may include, for example, a high definition multimedia interface (HDMI) 572, a USB 574, an optical interface 576, or a D-subminiature 578. Additionally or alternatively, the interface 570 may include a mobile high-definition link (MHL) interface, an SD card/multi-media card (MMC) interface or an infrared data association (IrDA) interface, for example.

The audio module 580 may convert sound into an electrical signal or vice versa. The audio module 580 may process sound information input or output through a speaker 582, a receiver 584, an earphone 586 or the microphone 588, for example.

The camera module 591 is a device that may capture still pictures and video, and according to an embodiment of the present disclosure, it is possible to include one or more image sensors (e.g., a front sensor or rear sensor), (not shown) lens, an image signal processor (ISP), or a flash (e.g., an LED or a xenon lamp).

The power management module 595 may manage the voltage of each unit of the electronic device 500. The power management module 595 may include at least one regulator that supplies a unit-dependent voltage to each unit of the electronic device 500. The regulator may convert an input voltage to output a voltage corresponding to the operating voltage of a unit connected to the regulator. According to various embodiments of the present disclosure, the power management module 595 may include a buck converter, low dropout regulator (LDO), boost converter, DC-DC regulator, switched regulator, an unregulated DC-DC converter, a switched capacitor, etc.

The power management module 595 may include a charging and discharging module (e.g., charger IC), battery, fuel gauge or power management IC (PMIC).

The charging and discharging module may charge a battery and prevent overvoltage or over current from a charger. According to an embodiment of the present disclosure, the charging and discharging module may include a charger IC for at least one of a wired charging technique and a wireless charging technique. The wireless charging technique includes, for example, a magnetic resonance type, a magnetic induction type, or an electromagnetic wave type, and an additional circuit for wireless charging may be added such as a coil loop, resonance circuit, or rectifier.

The charging and discharging module may change an operation mode according to a control signal received from a charging and discharging control module. The charging and discharging module may charge a battery connected to the charging and discharging module or supply a battery voltage to an external device connected to an electronic device 500, by an operation mode change. For example, when a power supply device supplying a voltage higher than the battery voltage of a battery is connected to the electronic device 500, the charging and discharging module may operate in a bypass-buck operation mode. The electronic device 500 may use the power supply device to charge the battery. Alternatively, when a power supply device supplying a voltage lower than the battery voltage of a battery is connected, the charging and discharging module may operate in a boost-buck operation mode. The electronic device 500 may use the power supply device to charge the battery. Alternatively, when a power consumption device consuming power is connected to the electronic device 500, the charging and discharging module may operate in a buck-bypass operation mode. The charging and discharging module may supply power to the power consumption device in the opposite direction to the way charging is performed.

The battery supplies power to the electronic device 500 through the power management module 595. A fuel gauge may sense the capacity of the battery. The fuel gauge may provide, to the AP 510, a notification of a battery level according to the usage of the electronic device 500.

The battery gauge may measure the level, current or temperature of the battery 596, or the voltage of the battery 596 during charging, for example. The battery 596 may store or generate electricity and use stored or generated electricity to supply power to the electronic device 500. The battery 596 may include a rechargeable battery or a solar battery, for example.

The PMIC may be included in an IC or an SoC semiconductor, for example. Charging techniques may be classified into wired and wireless techniques.

The indicator 597 may show the specific states of the electronic device 500 or a part (e.g., the AP 510) of the electronic device 500, such as a booting state, a message state and a charged state. The indicator 597 may include an LED. The motor 598 may convert an electrical signal into mechanical vibration. Although not shown, the electronic device 500 may include a processing device (e.g., a GPU) for supporting a mobile TV. The processing device for supporting the mobile TV may process media data according to a standard such as digital multimedia broadcasting (DMB), digital video broadcasting (DVB) or media flow.

An electronic device according to various embodiments of the present disclosure may include a connector to which an external device is connected; a control unit identifying a connected external device and controlling operations of a voltage conversion unit and a charging and discharging unit according to an identification result; the voltage conversion unit bypassing a supply voltage supplied from the external device, boosting the supply voltage, or converting a battery voltage of a battery connected to an electronic device to supply a converted voltage to the external device, according to the identification result; and the charging and discharging unit lowering a voltage supplied from the voltage conversion unit or bypassing the battery voltage of the battery to the voltage conversion unit, according to the identification result.

According to various embodiments of the present disclosure, the voltage conversion unit may bypass or boost the supply voltage and the charging and discharging unit lowers a bypassed voltage or a boosted voltage to charge the battery, when the external device is a power supply device.

According to various embodiments of the present disclosure, the charging and discharging unit may bypass the battery voltage to the voltage conversion unit and the voltage conversion unit may convert a bypassed battery voltage to supply a converted voltage to a power consumption device, when the external device is the power consumption device.

According to various embodiments of the present disclosure, the voltage conversion unit may bypass or boost the supply voltage according to a value of a supply voltage supplied from the power supply device.

According to various embodiments of the present disclosure, the voltage conversion unit may bypass the supply voltage when a value of the supply voltage is equal to or higher than a set voltage value, and boost the supply voltage when the value of the supply voltage is lower than the set voltage value.

According to various embodiments of the present disclosure, the set voltage value may be a minimum chargeable voltage according to a battery connected to the electronic device.

According to various embodiments of the present disclosure, the voltage conversion unit may boost the supply voltage to a minimum chargeable voltage according to a battery connected to the electronic device, when the value of the supply voltage is lower than the set voltage value.

According to various embodiments of the present disclosure, the voltage conversion unit may convert the battery voltage into an operating voltage of the power consumption device.

According to various embodiments of the present disclosure, the control unit may identify a type of the external device and a supply voltage or operating voltage of the external device.

According to various embodiments of the present disclosure, the battery may be a serial cell battery.

According to various embodiments of the present disclosure, the electronic device may further include an unregulated DC/DC converter lowering a battery voltage of the battery to supply a voltage to each unit of the electronic device.

According to various embodiments of the present disclosure, the electronic device may further include a switched capacitor lowering a battery voltage of the battery to supply a voltage to each unit of the electronic device.

According to various embodiments of the present disclosure, the power supply device may supply a supply voltage and current according to a request from the electronic device.

According to various embodiments of the present disclosure, the power supply device may supply a voltage lower than the battery voltage.

According to various embodiments of the present disclosure, the power consumption device may be a USB OTG device functionally connectable to the electronic device.

According to various embodiments of the present disclosure, the voltage conversion unit and the charging and discharging unit may be coupled in terms of circuit to configure a module.

Figure 6:
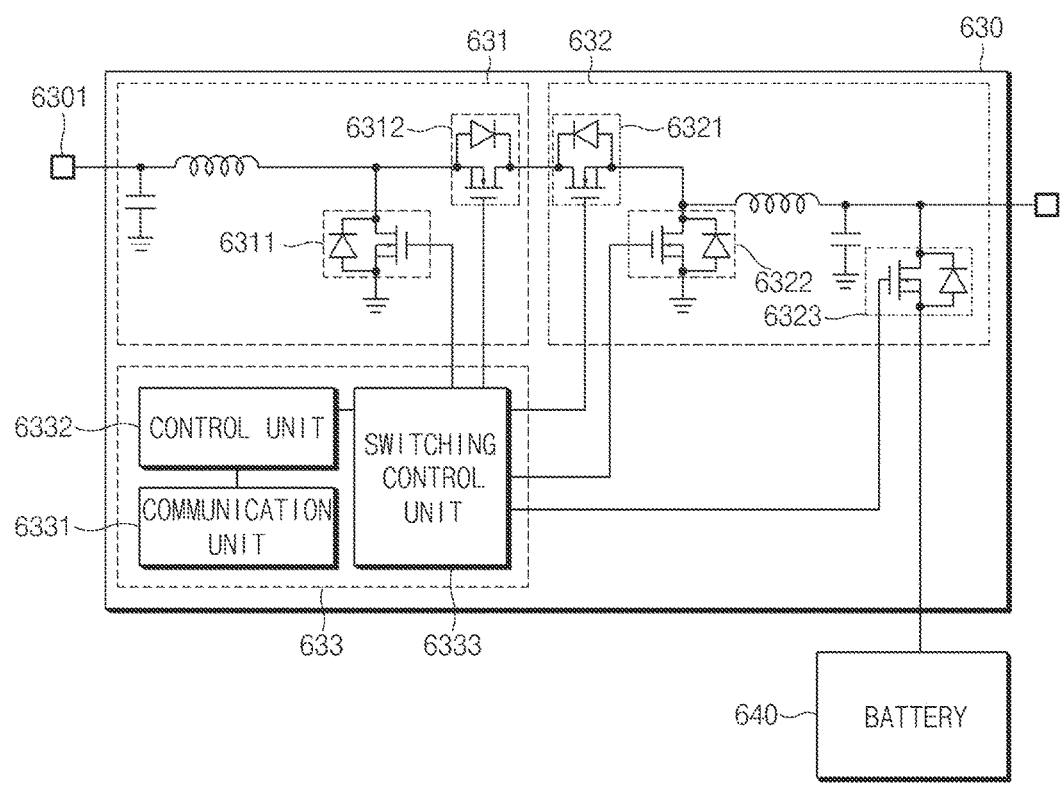
FIG. 6 shows a block diagram of a charging and discharging module according to various embodiments of the present disclosure.

FIG. 6 shows a block diagram of a charging and discharging module according to various embodiments of the present disclosure.

FIG. 6 represents an example of the charging and discharging module in FIGS. 1 to 5 according to an embodiment of the present disclosure. It may be seen that descriptions that are omitted in the present embodiment but provided above with respect to the charging and discharging module in FIGS. 1 to 5 are also applied to the charging and discharging module in FIG. 6.

Referring to FIG. 6, a charging and discharging module 630 may include a voltage conversion unit 631, a charging and discharging unit 632, and a charging and discharging control unit 633. FIG. 6 shows that the charging and discharging module 630 according to the present embodiment includes the voltage conversion unit 631 and the charging and discharging control unit 633 that controls the charging and discharging unit 632. However, the present disclosure is not limited thereto and the charging and discharging control unit 633 may be located external to the charging and discharging module 630 as shown in FIG. 1 or 4.

The voltage conversion unit 631 may convert a voltage according to a control signal from the charging and discharging control unit 633. The voltage conversion unit 631 may have a circuit configuration as shown in FIG. 6 according to an embodiment of the present disclosure. The present disclosure is not limited thereto and the voltage conversion unit 631 may be implemented in various circuit configurations capable of performing the same function as the voltage conversion unit 631 described herein in addition to the circuit configuration in FIG. 6, according to various embodiments of the present disclosure. Alternatively, the voltage conversion unit 631 may further include other general circuit elements in addition to the circuit elements in FIG. 6, according to various embodiments of the present disclosure.

For example, the voltage conversion unit 631 may convert a voltage according to the On/Off operation of a first switch 6311 and a second switch 6312. For example, the voltage conversion unit 631 may operate as a boost converter or buck converter, or bypass a voltage. The first switch 6311 and the second switch 6312 may perform an On/Off operation according to a control signal received from a switching control unit 6333 of a charging and discharging control unit 633.

For example, the first switch 6311 and the second switch 6312 may be implemented in a transistor (e.g., Field Effect Transistor (FET)). However, the switches are not limited thereto and may be implemented in various types of switches that may control the operation of the voltage conversion unit 631.

The charging and discharging unit 632 may charge the battery 640 or bypass a battery voltage, according to a control signal from the charging and discharging control unit 633. The charging and discharging unit 632 may have a circuit configuration as shown in FIG. 6 according to an embodiment of the present disclosure. The present disclosure is not limited thereto and the charging and discharging unit 632 may be implemented in various circuit configurations capable of performing the same function as the charging and discharging unit 632 described herein in addition to the circuit configuration in FIG. 6, according to various embodiments of the present disclosure. Alternatively, the charging and discharging unit 632 may further include other general circuit elements in addition to the circuit elements in FIG. 6, according to various embodiments of the present disclosure.

For example, the charging and discharging unit 632 may charge the battery 640 or bypass a battery voltage, according to the On/Off operations of a third switch 6321, a fourth switch 6322 and a fifth switch 6323. For example, the charging and discharging unit 632 may operate as a buck converter or bypass a voltage. The third to fifth switches 6321 to 6323 may perform an On/Off operation according to a control signal received from the switching control unit 6333 of the charging and discharging control unit 633.

For example, the third to fifth switches 6321 to 6323 may be implemented in a transistor (e.g., Field Effect Transistor (FET)). However, the switches are not limited thereto and may be implemented in various types of switches that may control the operation of the charging and discharging unit 632.

When the charging and discharging unit 632 receives a control signal by the connection of a power supply device, the charging and discharging unit 632 may receive a bypassed or boosted voltage from the voltage conversion unit 631 and step down the bypassed or boosted voltage according to a battery voltage to charge the battery 640. Alternatively, when the charging and discharging unit 632 receives a control signal by the connection of a power consumption device, the charging and discharging unit 632 may bypass the battery voltage of the battery 640 to the voltage conversion unit 631 in the opposite direction to the way charging is performed.

The charging and discharging control unit 633 may use at least one of a control module (e.g., control module 120 in FIG. 1 or charging and discharging control module 422 in FIG. 4), identification module (e.g., identification module 220 in FIG. 2) and communication module (e.g., communication module 320 in FIG. 3) to identify an external device. The charging and discharging control unit 633 may control the operation of the voltage conversion unit 631 or charging and discharging unit 632 according to an identification result obtained by identifying the external device. The charging and discharging control unit 633 may transmit a control signal to the voltage conversion unit 631 or the charging and discharging unit 632.

According to an embodiment of the present disclosure, the charging and discharging control unit 633 may include a communication unit 6331, a control unit 6332, and the switching control unit 6333. Alternatively, the charging and discharging control unit 633 may include the communication unit 6331 and the switching control unit 6333. Alternatively, the charging and discharging unit 633 may further include other general elements in addition to the circuit elements in FIG. 6, according to various embodiments of the present disclosure.

The communication unit 6331 may transmit and receive data to and from at least one module of an electronic device. For example, the communication unit 6331 may transmit and receive data to and from at least one module of the electronic device by using various transmission methods. For example, the communication unit 6331 may use an Inter-IC (I2C) interface, Universal Asynchronous Receiver Transmitter (UART) interface, Serial Peripheral Interface (SPI), bus, a data line connected to at least one module of the electronic device, etc. to transmit and receive data.

The control unit 6332 may control the communication unit 6331 and the switching control unit 6333. For example, the control unit 6332 may control data transmission and reception between the communication unit 6331 and at least one module of the electronic device. Alternatively, the control unit 6332 may transmit a control signal to the switching control unit 6333 so that the switching control unit 6333 controls the switches of the voltage conversion unit 631 or charging and discharging unit 632. For example, when the charging and discharging unit 632 operates as a buck converter, the control unit 6332 may determine a duty rate at which the switches of the charging and discharging unit 632 perform On/Off operations so that the input voltage of the charging and discharging unit 632 is converted according to the battery voltage of the battery 640. The control unit 6332 may transmit a set duty rate to the switching control unit 6333.

The switching control unit 6333 may control the switches of the voltage conversion unit 631 or the charging and discharging unit 632 according to a control signal received from the control unit 6332. For example, the switching control unit 6333 may perform an Off operation on at least one switch of the voltage conversion unit 631 or the charging and discharging unit 632. Alternatively, the switching control unit 6333 may perform an Off operation on the switches of the voltage conversion unit 631 or the charging and discharging unit 632 according to the set duty rate.

According to an embodiment of the present disclosure, when a power supply device supplying a voltage higher than the battery voltage of the battery 640 is connected to the electronic device, the switching control unit 6333 may transmit, to the first switch 6311, a control signal performing an Off operation on the first switch 6311, and to the second switch 6312, a control signal performing an On operation on the second switch 6312. According to the control signal from the switching control unit 6333, it is possible to perform the Off operation on the first switch 6311 and the On operation on the second switch 6312. Accordingly, the voltage conversion unit 631 may bypass an input voltage input through a terminal 6301. A bypassed voltage may be transmitted to the charging and discharging unit 632.

The switching control unit 6333 may transmit, to the third switch 6321 and the fourth switch 6322, control signals that perform On/Off operations on the third switch 6321 and the fourth switch 6322 at the set duty rate. The charging and discharging unit 632 may step down a bypassed voltage output from the voltage conversion unit 631 according to the set duty rate. For example, the charging and discharging unit 632 may operate as a buck converter that lowers the bypassed voltage according to the battery voltage of the battery 640. The charging and discharging unit 632 may charge the battery 640 at a lowered voltage.

According to an embodiment of the present disclosure, when a power supply device supplying a voltage lower than the battery voltage of the battery 640 is connected to the electronic device, it is possible to transmit, to the first switch 6311 and the second switch 6312, control signals that perform On/Off operations on the first switch 6311 and the second switch 6312 at a set duty rate. The voltage conversion unit 631 may boost an input voltage input through the terminal 6301 according to the set duty rate. For example, the voltage conversion unit 631 may operate as a boost converter that boosts the input voltage. The voltage conversion unit 631 may transmit a boosted voltage to the charging and discharging unit 632.

The switching control unit 6333 may transmit, to the third switch 6321 and the fourth switch 6322, control signals that perform On/Off operations on the third switch 6321 and the fourth switch 6322 according to the set duty rate. The charging and discharging unit 632 may step down a voltage output from the voltage conversion unit 631 (a voltage boosted at the voltage conversion unit 631) according to the set duty rate. For example, the charging and discharging unit 632 may operate as a buck converter that lowers the boosted voltage according to the battery voltage of the battery 640. The charging and discharging unit 632 may charge the battery 640 at a lowered voltage.

According to an embodiment of the present disclosure, when a power consumption device is connected to the electronic device, the switching control unit 6333 may transmit, to the third switch 6321, a control signals performing an On operation on the third switch 6321, and to the fourth switch 6322, a control signal performing an Off operation on the fourth switch 6322. According to the control signal from the switching control unit 6333, it is possible to perform the On operation on the third switch 6321 and the Off operation on the fourth switch 6322. Accordingly, the charging and discharging unit 632 may bypass the battery voltage of the battery 640. A bypassed voltage may be transmitted to the voltage conversion unit 631. The charging and discharging module 630 operates in the opposite direction to the way charging is performed.

The switching control unit 6333 may transmit, to the first switch 6311 and the second switch 6312, control signals that perform On/Off operations on the first switch 6311 and the second switch 6312 according to the set duty rate. The voltage conversion unit 631 may step down a voltage output from the charging and discharging unit 632 (a voltage bypassed at the charging and discharging unit 632) according to the set duty rate. For example, the voltage conversion unit 631 may operate as a buck converter that lowers the bypassed voltage according to the operating voltage of an external device. The voltage conversion unit 631 may supply a lowered voltage to the external device.

Figure 7:
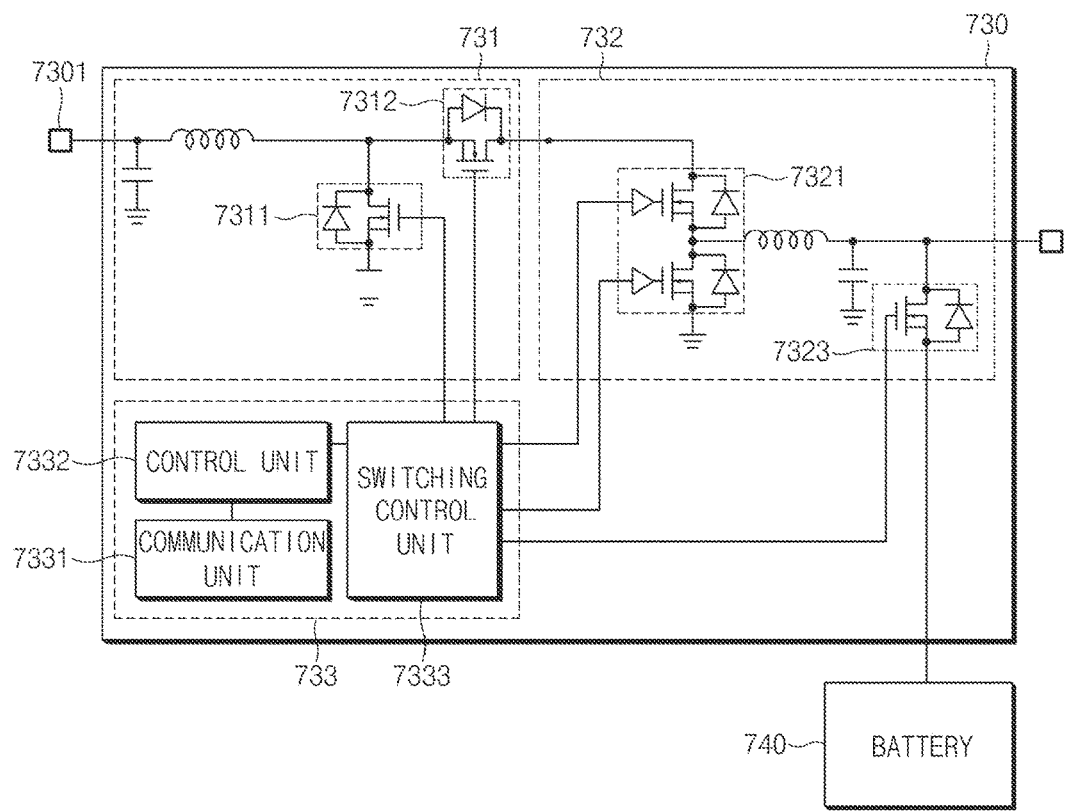
FIG. 7 shows a block diagram of a charging and discharging module according to various embodiments of the present disclosure.

FIG. 7 shows a block diagram of a charging and discharging module according to various embodiments of the present disclosure.

FIG. 7 represents an example of the charging and discharging module in FIGS. 1 to 5 according to an embodiment of the present disclosure. Unlike the charging and discharging module 630 in FIG. 6, a charging and discharging module 730 in FIG. 7 is configured in a circuit using a driver metal-oxide-semiconductor field-effect transistor (MOSFET) (DrMOS). The charging and discharging module 730 according to the present embodiment includes the DrMOS in a charging and discharging unit 732 circuit. However, the present disclosure is not limited thereto and the charging and discharging module 730 may use the DrMOS for a voltage conversion unit 731 or a charging and discharging control unit 733.

Since the voltage conversion unit 731 and the charging and discharging control unit 733 in FIG. 7 correspond to the voltage conversion unit 631 and the charging and discharging control unit 633 in FIG. 6, their repeated descriptions are omitted. In particular, switches 7311 and 7312 of FIG. 7 respectively correspond to switches 6311 and 6312 of FIG. 6 and thus their descriptions are omitted. Also, communication unit 7331, control unit 7332, and switching control unit 7333 of FIG. 7 respectively correspond to communication unit 6331, control unit 6332, and switching control unit 6333 of FIG. 6 and thus their descriptions are omitted. A terminal 7301 in FIG. 7 may correspond to the terminal 6301 in FIG. 6.

The charging and discharging unit 732 may charge the battery 740 or bypass a battery voltage, according to a control signal from the charging and discharging control unit 733. For example, the charging and discharging unit 732 may charge the battery 740 or bypass the battery voltage, according to the operation of a DrMOS 7321 or a switch 7323. For example, the charging and discharging unit 732 may operate as a buck converter or bypass a voltage. The DrMOS 7321 or the switch 7323 may operate according to a control signal received from the switching control unit 7333 of the charging and discharging control unit 733.

When the charging and discharging unit 732 receives a control signal by the connection of a power supply device, the charging and discharging unit 732 may receive a bypassed or boosted voltage from the voltage conversion unit 731 and step down the bypassed or boosted voltage according to a battery voltage to charge the battery 740. Alternatively, when the charging and discharging unit 732 receives a control signal by the connection of a power consumption device, the charging and discharging unit 732 may bypass the battery voltage of the battery 740 to the voltage conversion unit 731 in the opposite direction to the way charging is performed.

Figure 8:
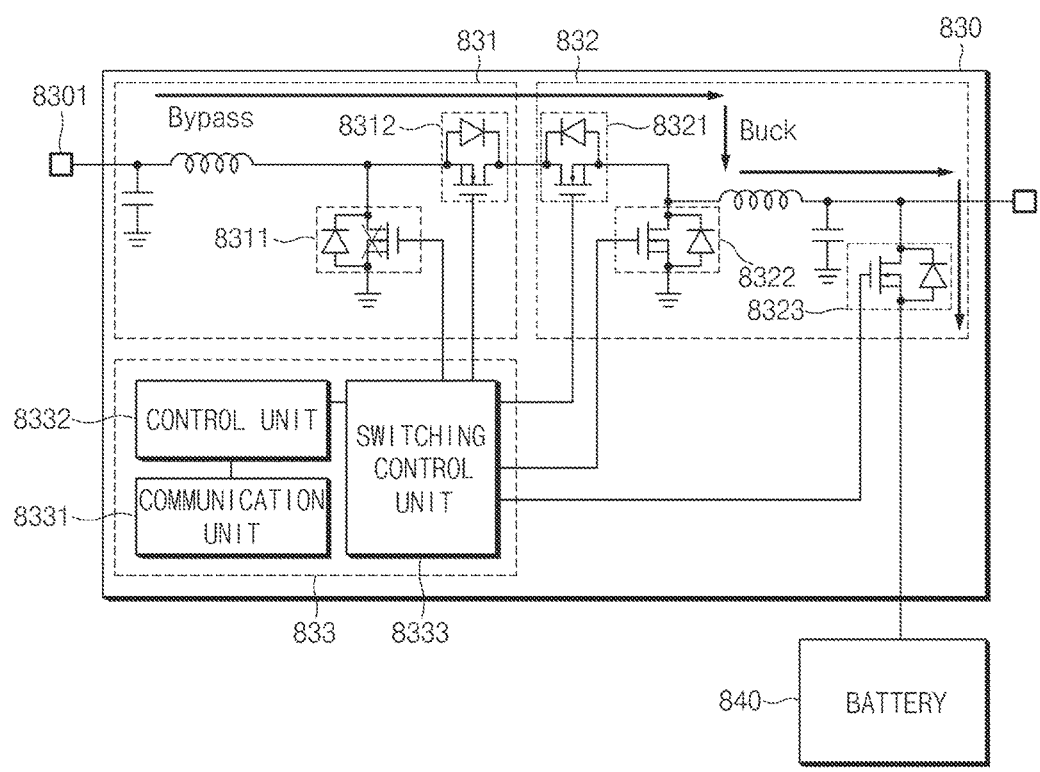
FIG. 8 represents the operation of a charging and discharging module of an external device connected to an electronic device according to various embodiments of the present disclosure.

FIG. 8 represents the operation of a charging and discharging module of an external device connected to an electronic device according to various embodiments of the present disclosure.

FIG. 8 shows the operation of a charging and discharging module 830 when a power supply device supplying a voltage higher than a battery voltage is connected to the electronic device.

According to an embodiment of the present disclosure, a power adapter supplying a voltage higher than the battery voltage may be connected to the electronic device including the charging and discharging module 830. For example, when a battery 840 is a battery obtained by connecting two cell batteries in series, the battery 840 may have a battery voltage of about 6.8 V to about 8.6 V. The power adapter according to the present embodiment may be a 20 V power adapter that supplies a voltage higher than the battery voltage. When the 20 V power adapter is connected to the electronic device, the charging and discharging module 830 may operate in a bypass-buck mode.

According to an embodiment of the present disclosure, the external device may be an adaptive power adapter that may supply, to an electronic device 800 including the charging and discharging module 830, a supply voltage and current according to a request from the electronic device. The adaptive power adapter may change a supply voltage and current supplied to the electronic device. For example, the electronic device may perform communication with the adaptive power adapter through a communication module to request a desired voltage value and current value from the power adapter. The adaptive power adapter may provide a voltage and current in response to the request by the electronic device. For example, when the battery 840 is a battery obtained by connecting two battery cells in series, the charging and discharging module 830 may operate in a bypass-buck mode if the adaptive power adapter capable of providing a voltage of 9 V, 12 V or 20 V is connected to the electronic device.

According to an embodiment of the present disclosure, the charging and discharging control unit 833 may include a communication unit 8331, a control unit 8332, and a switching control unit 8333. The communication unit 8331 may receive, a signal representing that a power adapter supplying a voltage higher than the battery voltage of the battery 840 has been connected to the electronic device, from at least one of a control module (e.g., control module 120 in FIG. 1 or charging and discharging control module 422 in FIG. 4), identification module (e.g., identification module 220 in FIG. 2) and communication module (e.g., communication module 320 in FIG. 3). A terminal 8301 in FIG. 8 may correspond to the terminal 7301 in FIG. 7 and the terminal 6301 in FIG. 6.

The control unit 8332 may determine the operation mode of the charging and discharging module 830 based on a signal received from the communication unit 8331, and transmit a control signal to the switching control unit 8333. According to an embodiment of the present disclosure, since a power supply device supplying a voltage higher than the battery voltage of the battery 840 is connected, the control unit 8332 may determine that the charging and discharging module 830 should operate in a bypass-buck operation mode. The control unit 8332 may transmit a control signal to the switching control unit 8333 so that the charging and discharging module 830 operates according to the bypass-buck operation mode.

The switching control unit 8333 may transmit a control signal to control at least one of the first switch 8311, second switch 8312, third switch 8321, fourth switch 8322, and fifth switch 8323. According to an embodiment of the present disclosure, the switching control unit 8333 may transmit a control signal performing an Off operation on the first switch 8311 and a control signal performing an On operation on the second switch 8312 to the first switch 8311 and the second switch 8312, respectively. Accordingly, the voltage conversion unit 831 may bypass the input voltage of the voltage conversion unit 831. A supply voltage supplied from the power adapter may be bypassed and transmitted to the charging and discharging unit 832. The switching control unit 8333 may transmit, to the third switch 8321 and the fourth switch 8322, control signals that perform On/Off operations on the third switch 8321 and the fourth switch 8322 according to a set duty rate. Accordingly, the charging and discharging unit 832 may step down a bypassed voltage to charge the battery 840. The charging and discharging unit 832 may operate as a buck converter that converts the bypassed voltage according to the battery voltage of the battery 840.

Figure 9:
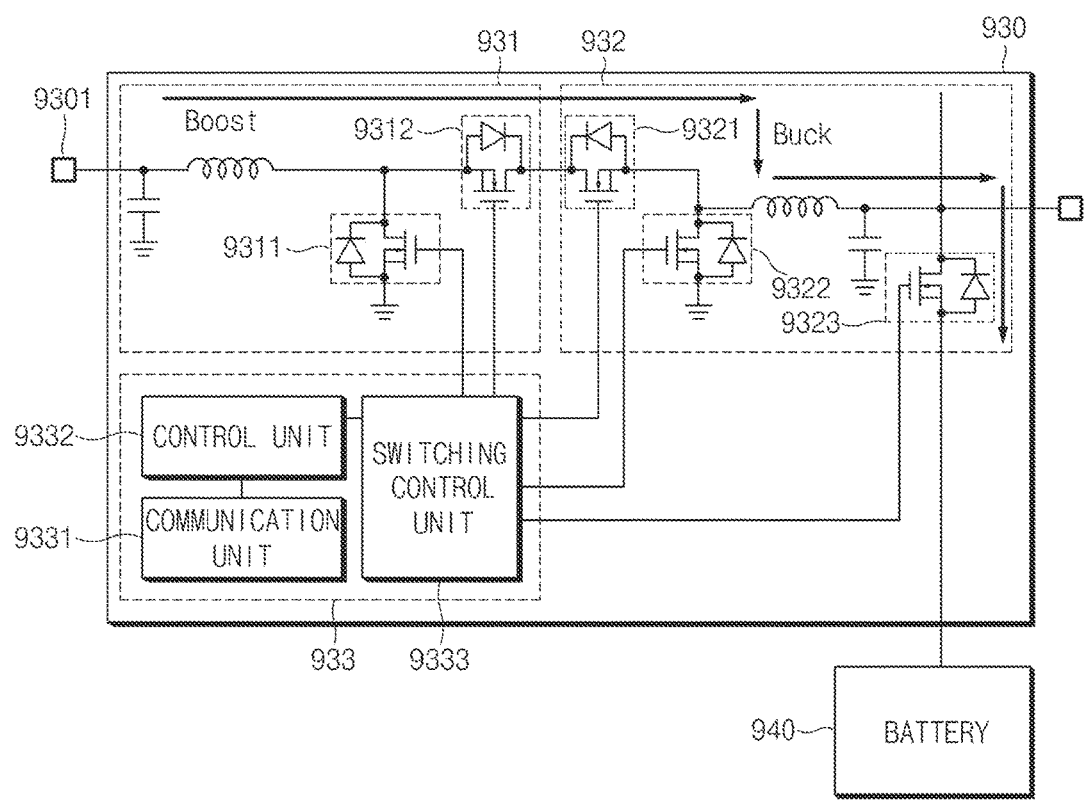
FIG. 9 represents the operation of a charging and discharging module of an external device connected to an electronic device according to various embodiments of the present disclosure.

FIG. 9 represents the operation of a charging and discharging module of an external device connected to an electronic device according to various embodiments of the present disclosure.

FIG. 9 shows the operation of a charging and discharging module 930 when a power supply device supplying a voltage lower than a battery voltage is connected to an electronic device.

According to an embodiment of the present disclosure, a power adapter supplying a voltage lower than the battery voltage may be connected to the electronic device including the charging and discharging module 930. For example, when a battery 940 is a battery obtained by connecting two cell batteries in series, the battery 940 may have a battery voltage of about 6.8 V to about 8.6 V. The power adapter according to the present embodiment may be a 5V power adapter that supplies a voltage lower than the battery voltage. When the 5V power adapter is connected to the electronic device, the charging and discharging module 930 may operate in a boost-buck mode.

According to an embodiment of the present disclosure, the external device may be an adaptive power adapter that may supply, to the electronic device including the charging and discharging module 930, a supply voltage and current according to a request from the electronic device. For example, when the battery 940 is a battery obtained by connecting two battery cells in series, the charging and discharging module 930 may operate in a boost-buck mode when the adaptive power adapter supplies a voltage of 5 V.

According to an embodiment of the present disclosure, the charging and discharging control unit 933 may include a communication unit 9331, a control unit 9332, and a switching control unit 9333. The communication unit 9331 may receive, a signal representing that a power adapter supplying a voltage lower than the battery voltage of the battery 940 has been connected to the electronic device, from at least one of a control module (e.g., control module 120 in FIG. 1 or charging and discharging control module 422 in FIG. 4), identification module (e.g., identification module 220 in FIG. 2) and communication module (e.g., communication module 320 in FIG. 3).

The control unit 9332 may determine the operation mode of the charging and discharging module 930 based on a signal received from the communication unit 9331, and transmit a control signal to the switching control unit 9333. According to an embodiment of the present disclosure, since a power supply device supplying a voltage lower than the battery voltage of the battery 940 is connected, the control unit 9332 may determine that the charging and discharging module 930 should operate in a boost-buck operation mode. The control unit 9332 may transmit a control signal to the switching control unit 9333 so that the charging and discharging module 930 operates according to the boost-buck operation mode.

The switching control unit 9333 may transmit a control signal to control at least one of a first switch 9311, second switch 9312, third switch 9321, fourth switch 9322, and fifth switch 9323. According to an embodiment of the present disclosure, the switching control unit 9333 may transmit, to the first switch 9311 and the second switch 9312, control signals that perform On/Off operations on the first switch 9311 and the second switch 9312 according to a set duty rate. Accordingly, the voltage conversion unit 931 may boost the input voltage of the voltage conversion unit 931. A supply voltage supplied from the power adapter may be boosted and transmitted to the charging and discharging unit 932. For example, when the battery 940 is a battery obtained by connecting two battery cells in series and the power adapter is a 5 V power adapter supplying a voltage lower than the battery voltage, the voltage conversion unit 931 may boost a supply voltage from about 5 V to about 9 V to transmit a boosted voltage to the charging and discharging unit 932. A terminal 9301 in FIG. 9 may correspond to the terminal 8301 in FIG. 8, the terminal 7301 in FIG. 7, and the terminal 6301 in FIG. 6.

The switching control unit 9333 may transmit, to the third switch 9321 and the fourth switch 9322, control signals that perform On/Off operations on the third switch 9321 and the fourth switch 9322 according to a set duty rate. Accordingly, the charging and discharging unit 932 may step down a boosted voltage to charge the battery 940. The charging and discharging unit 932 may operate as a buck converter that converts the boosted voltage according to the battery voltage of the battery 940.

Figure 10:
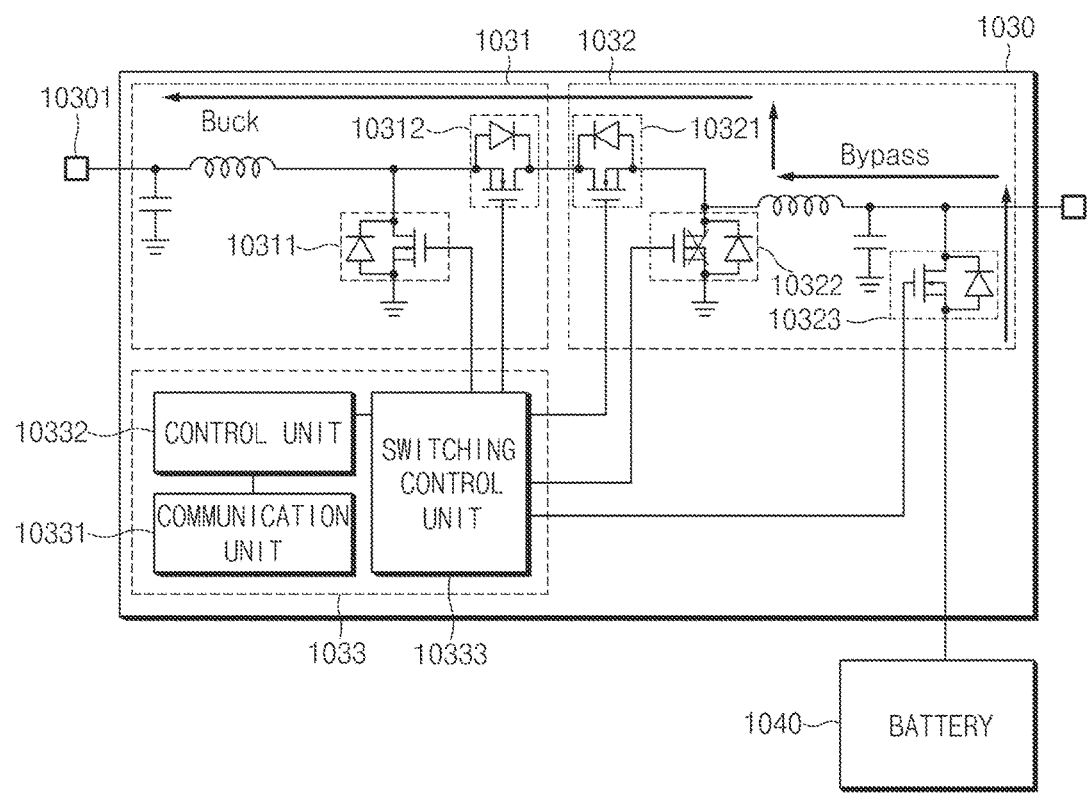
FIG. 10 represents the operation of a charging and discharging module of an external device connected to an electronic device according to various embodiments of the present disclosure.

FIG. 10 represents the operation of a charging and discharging module of an external device connected to an electronic device according to various embodiments of the present disclosure.

FIG. 10 represents the operation of a charging and discharging module 1030 when a power consuming device consuming power is connected to the electronic device.

According to an embodiment of the present disclosure, a USB OTG device functionally connectable to the electronic device may be connected to the electronic device including the charging and discharging module 1030. The USB OTG device may use the battery voltage of the electronic device 100 for operation.

For example, when a battery 1040 is a battery obtained by connecting two cell batteries in series, the battery 1040 may have a battery voltage of about 6.8 V to about 8.6 V. The USB OTG device according to an embodiment of the present disclosure may be a USB OTG device that operates at a voltage lower than the battery voltage. When the USB OTG device is connected to the electronic device, the charging and discharging module 1030 may operate in a buck-bypass mode.

According to an embodiment of the present disclosure, the charging and discharging control unit 1033 may include a communication unit 10331, a control unit 10332, and a switching control unit 10333. The communication unit 10331 may receive, a signal representing that the USB OTG device operating at a voltage lower than the battery voltage has been connected to the electronic device, from at least one of a control module (e.g., control module 120 in FIG. 1 or charging and discharging control module 422 in FIG. 4), identification module (e.g., identification module 220 in FIG. 2) and communication module (e.g., communication module 320 in FIG. 3).

The control unit 10332 may determine the operation mode of the charging and discharging module 1030 based on a signal received from the communication unit 10331, and transmit a control signal to the switching control unit 10333 according to a determined operation mode. According to an embodiment of the present disclosure, since the USB OTG device operating at a voltage lower than the battery voltage of the battery 1040 is connected, the control unit 10332 may determine that the charging and discharging module 1030 should operate in a buck-bypass operation mode. The charging and discharging module 1030 may supply the battery voltage to the USB OTG device in the opposite direction to the way charging is performed. The control unit 10332 may transmit a control signal to the switching control unit 10333 so that the charging and discharging module 1030 operates according to the buck-bypass operation mode.

The switching control unit 10333 may transmit a control signal to control at least one of a first switch 10311, second switch 10312, third switch 10321, fourth switch 10322, and fifth switch 10323. According to an embodiment of the present disclosure, the switching control unit 10333 may transmit a control signal performing an On operation on the third switch 10321 and a control signal performing an Off operation on the fourth switch 10322 to the third switch 10321 and the fourth switch 10322, respectively. Accordingly, the charging and discharging unit 1032 may bypass the battery voltage. The battery voltage may be bypassed and transmitted to the voltage conversion unit 1031. A terminal 10301 in FIG. 10 may correspond to the terminal 9301 in FIG. 9, the terminal 8301 in FIG. 8, the terminal 7301 in FIG. 7, and the terminal 6301 in FIG. 6.

The switching control unit 10333 may transmit, to the first switch 10311 and the second switch 10312, control signals that perform On/Off operations on the first switch 10311 and the second switch 10312 according to a set duty rate. Accordingly, the voltage conversion unit 1031 may step down a bypassed battery voltage.

For example, when the battery 1040 is a battery obtained by connecting two battery cells in series and the USB OTG device is a USB OTG device operating at a voltage lower than the battery voltage, the voltage conversion unit 1031 may lower, the bypassed battery voltage of about 6.8 V to about 8.6 V, to the operating voltage. It is possible to step down the bypassed voltage to supply a lowered voltage to the USB OTG device. The voltage conversion unit 1032 may operate as a buck converter that converts the bypassed battery voltage according to the operating voltage of the USB OTG device.

Figure 11:
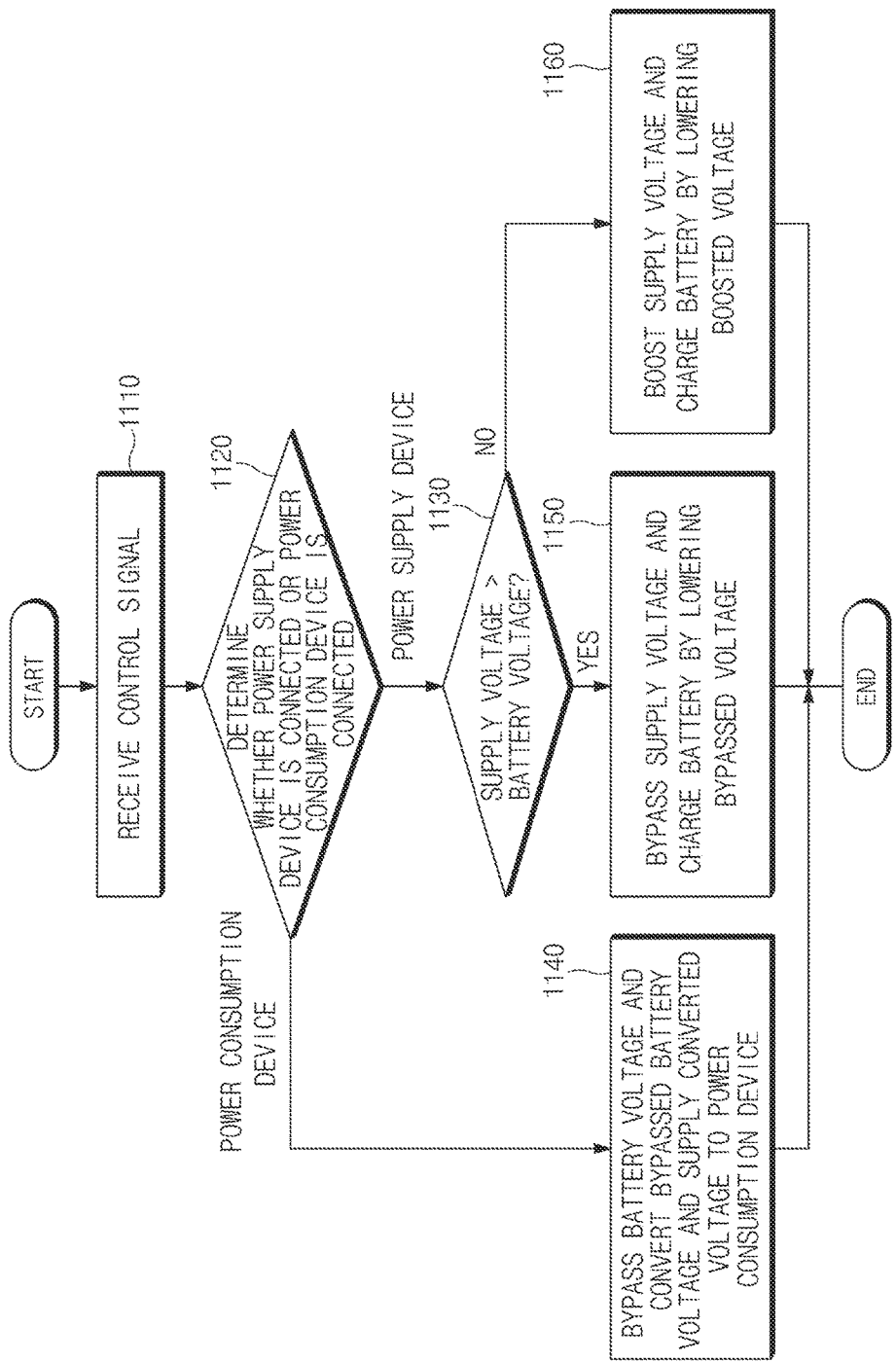
FIG. 11 represents a method of charging a battery at an electronic device according to various embodiments of the present disclosure.

FIG. 11 represents a method of charging a battery at an electronic device according to various embodiments of the present disclosure.

Referring to FIG. 11, the method in FIG. 11 includes operations that are processed by the electronic devices 100 to 500 in FIGS. 1 to 5. Thus, it may be seen that descriptions omitted in the present embodiment but provided above with respect to the electronic devices 100 to 500 may also be applied to the method in FIG. 11.

In operation 1110, the charging and discharging module 130 may receive a control signal.

In operation 1120, when a received control signal is a control signal by the connection of a power supply device, the charging and discharging module 130 may perform operation 1130 and when the received control signal is a control signal by the connection of a power consumption device, the charging and discharging module 130 may perform operation 1140.

In operation 1130, the charging and discharging module 130 may perform operation 1150 when the supply voltage of the power supply device is higher than a battery voltage, and perform operation 1160 when the supply voltage of the power supply device is lower than the battery voltage.

In operation 1140, the charging and discharging module 130 may bypass the battery voltage and convert a bypassed battery voltage to supply a converted voltage to the power consumption device, in the opposite direction to a current flow direction when charging is performed. The charging and discharging module 130 may operate in a buck-bypass operation mode.

In operation 1150, the charging and discharging module 130 may bypass the supply voltage of the power supply device and step down a bypassed voltage to charge the battery 140. The charging and discharging module 130 may operate in a bypass-buck operation mode.

In operation 1160, the charging and discharging module 130 may boost the supply voltage of the power supply device and step down a boosted voltage to charge the battery 140. The charging and discharging module 130 may operate in a boost-buck operation mode.

A method of charging a battery according to various embodiments of the present disclosure includes receiving a control signal; bypassing or boosting a supply voltage of a power supply device and lowering a bypassed voltage or boosted voltage to charge a battery, when a received control signal is a control signal by a connection of the power supply device; and bypassing a battery voltage of the battery in an opposite direction to when charging is performed and converting a bypassed battery voltage to supply a converted voltage to a power consumption device, when the received control signal is a control signal by a connection of the power consumption device.

According to various embodiments of the present disclosure, it is possible to provide compatibility and minimize the value and manufacturing cost of a mobile electronic device while a large battery is stably used.

Each of the above-described elements of the electronic device according to various embodiments of the present disclosure may include one or more components and the names of corresponding elements may vary depending on the type of an electronic device. The electronic device according to various embodiments of the present disclosure may include at least one of the above-described elements and some elements may be omitted or other elements may be further included. Also, some of the elements of the electronic device according to various embodiments of the present disclosure are combined to form an entity, which may equally perform the functions of corresponding elements before being combined.

The term "module" used herein may mean a unit including one or two combinations of hardware, software and firmware, for example. The "module" may be interchangeably used with the term "unit", "logic", "logical block", "component", or "circuit", for example. The "module" may be an elementary unit of or a portion of an integral component. The "module" may also be an elementary unit for performing one or more functions or a portion of the elementary unit. The "module" may be implemented mechanically or electronically. For example, the "module" according to the present disclosure may include at least one of an application-specific IC (ASIC) chip, a field-programmable gate array (FPGA) and a programmable-logic device that perform some operations known or to be developed.

According to various embodiments of the present disclosure, at least some of devices (e.g., modules or their functions) or methods (e.g., operations) according to the present disclosure may be implemented as commands stored in a non-transitory computer-readable storage medium in the form of a programming module, for example. When the command is executed by one or more processors (e.g., the AP 510), the one or more processors may perform a function corresponding to the command. The non-transitory computer-readable storage medium may be the memory 530, for example. At least a portion of the programming module may be implemented (e.g., performed) by e.g., the AP 510. At least a portion of the programming module may include e.g., a module, program, routine, set of instructions or process for executing one or more functions.

The non-transitory computer-readable recording medium may include a magnetic medium such as a hard disk, a floppy disk and a magnetic tape, an optical medium such as a compact disk ROM (CD-ROM) and a DVD, a magneto-optical medium such as an elliptical disk, and a hardware device that is especially configured to store and execute a program command (e.g., a programming module), such as a ROM, a RAM, and a flash memory. Also, the program command may include a machine code made by a compiler and a high-level language code that may be executed by a computer by using an interpreter. The above-described hardware device may be configured to operate by one or more software modules to execute the operations of the present disclosure and vice versa.

The module or programming module according to the present disclosure may include at least one of the above-described elements, omit some elements or further include other elements. Operations executed by a module, a programming module or another element according to the present disclosure may be executed by using a sequential, parallel, repetitive or heuristic method. Also, the order in which some operations are performed may vary, some operations may be omitted or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a connector to which an external device is connected;
   a voltage conversion circuit electronically connected to the connector;
   a charging and discharging circuit electronically connected to the voltage conversion circuit;
   a battery electronically connected to the charging and discharging circuit; and
   at least one processor electronically connected to the connector, the voltage conversion circuit, and the charging and discharging circuit,
   wherein, when the external device is a power supply device, the at least one processor is configured to:
     control the voltage conversion circuit to bypass a supply voltage supplied from the external device or to boost the supply voltage, and
     control the charging and discharging circuit to step down the bypassed or boosted voltage supplied from the voltage conversion circuit and to supply the stepped down voltage to the battery; and
   wherein, when the external device is a power consumption device, the at least one processor is configured to:
     control the charging and discharging circuit to bypass a battery voltage of the battery such that the battery voltage is supplied to the voltage conversion circuit, and control the voltage conversion circuit to convert the battery voltage of the battery and to supply the converted voltage to the external device.

2. The electronic device of claim 1, wherein the at least one processor is further configured to:
control the voltage conversion circuit to convert the bypassed battery voltage, and
control the voltage conversion circuit to supply the converted voltage to the external device, if the external device is the power consumption device.

3. The electronic device of claim 2, wherein the at least one processor is further configured to control the voltage conversion circuit to convert the battery voltage into an operating voltage of the power consumption device.

4. The electronic device of claim 2, wherein the power consumption device comprises a universal serial bus on-the-go (USB OTG) device functionally connectable to the electronic device.

5. The electronic device of claim 1, further comprising:
a transceiver configured to communicate with the connected external device,
wherein the at least one processor is further configured to control the voltage conversion circuit and the charging and discharging circuit, based on information transmitted to and received from the external device through the transceiver.

6. The electronic device of claim 1, wherein the at least one processor is further configured to control the charging and discharging circuit to lower the bypassed voltage or the boosted voltage to charge the battery, if the external device is the power supply device.

7. The electronic device of claim 6, wherein the at least one processor is further configured to control the voltage conversion circuit to bypass or boost the supply voltage according to a value of the supply voltage supplied from the power supply device.

8. The electronic device of claim 6, wherein the at least one processor is further configured to control the voltage conversion circuit to:
bypass the supply voltage when a value of the supply voltage is equal to or higher than a set voltage value, and
boost the supply voltage when the value of the supply voltage is lower than the set voltage value.

9. The electronic device of claim 8, wherein the set voltage value is a minimum chargeable voltage according to the battery connected to the electronic device.

10. The electronic device of claim 8, wherein the at least one processor is further configured to control the voltage conversion circuit boost the supply voltage to a minimum chargeable voltage according to the battery connected to the electronic device, when the value of the supply voltage is lower than the set voltage value.

11. The electronic device of claim 6, wherein the power supply device comprises a power adapter which supplies a supply voltage and current in response to a request from the electronic device.

12. The electronic device of claim 6, wherein the power supply device comprises a power adapter which supplies a voltage lower than the battery voltage.

13. The electronic device of claim 1, wherein the at least one processor is further configured to identify a type of the external device and a supply voltage or operating voltage of the external device.

14. The electronic device of claim 1, wherein the battery comprises a serial cell battery.

15. The electronic device of claim 1, further comprising an unregulated direct current/direct current (DC/DC) converter supplying a voltage by lowering a battery voltage of the battery.

16. The electronic device of claim 1, further comprising a switched capacitor supplying a voltage by lowering a battery voltage of the battery.

17. The electronic device of claim 1, wherein the voltage conversion circuit and the charging and discharging circuit are collectively configured as a module.

18. A charging device comprising:
a connector to which an external device is connected;
a voltage conversion circuit electronically connected to the connector;
a charging and discharging circuit electronically connected to the voltage conversion circuit;
a battery electronically connected to the charging and discharging circuit;
at least one processor electronically connected to the connector, the voltage conversion circuit, and the charging and discharging circuit,
wherein the at least one processor is configured to:
control the voltage conversion circuit to bypass or boost a supply voltage of a power supply device if a control signal by a connection of the power supply device is received,
control the voltage conversion circuit to convert a battery voltage of the battery connected to the charging device if a control signal by a connection of a power consumption device is received,
control the charging and discharging circuit to lower a voltage supplied from the voltage conversion circuit if the connection is made with the power supply device, and
control the charging and discharging circuit to bypass the battery voltage of the battery such that the battery voltage is supplied to the voltage conversion circuit if the connection is made with the power consumption device.

19. The charging device of claim 18,
wherein the at least one processor is further configured to control the voltage conversion circuit to bypass or boost the supply voltage according to a value of the supply voltage, and
wherein the at least one processor is further configured to control the charging and discharging circuit to lower a bypassed voltage or a boosted voltage to charge the battery, if the control signal by the connection of the power supply device is received.

20. The charging device of claim 19, wherein the at least one processor is further configured to control the voltage conversion circuit to:
bypass the supply voltage if the control signal is a control signal by the connection of the power supply device having a supply voltage equal to or higher than a set voltage value, and
boost the supply voltage if the control signal is a control signal by the connection of the power supply device having a supply voltage value lower than the set voltage value.

21. The charging device of claim 18, wherein the at least one processor is further configured to control the voltage conversion circuit to:
convert a bypassed battery voltage, and
supply the converted voltage to the power consumption device, if the control signal by the connection of the power consumption device is received.

22. The charging device of claim 18, further comprising a charging and discharging control circuit transmitting a control signal to the voltage conversion circuit and the charging and discharging circuit according to the connection of the power supply device or the power consumption device.

23. The charging device of claim 18, wherein the battery comprises a serial cell battery.

24. A method of charging a battery, the method comprising:
- receiving a control signal by a unit;
- bypassing or boosting a supply voltage of a power supply device and lowering the bypassed voltage or boosted voltage to charge a battery, when the received control signal is generated by a connection of the power supply device to the unit;
- generating a battery voltage of the battery by directing a current in a direction opposite to when charging is performed when the received control signal is generated by a connection of the power consumption device to the unit;
- converting the battery voltage when the received control signal is generated by a connection of the power consumption device to the unit; and
- supplying the converted battery voltage to a power consumption device, when the received control signal is generated by a connection of the power consumption device to the unit.

* * * * *